United States Patent
Momose et al.

(10) Patent No.: US 8,329,065 B2
(45) Date of Patent: Dec. 11, 2012

(54) CARBON NANOTUBE-CONTAINING COMPOSITION, COMPOSITE, AND METHODS FOR PRODUCING THEM

(75) Inventors: Fumino Momose, Yokohama (JP); Takashi Saitoh, Yokohama (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 639 days.

(21) Appl. No.: 12/096,072

(22) PCT Filed: Dec. 5, 2006

(86) PCT No.: PCT/JP2006/324240
§ 371 (c)(1),
(2), (4) Date: Jul. 7, 2009

(87) PCT Pub. No.: WO2007/066649
PCT Pub. Date: Jun. 14, 2007

(65) Prior Publication Data
US 2010/0065788 A1 Mar. 18, 2010

(30) Foreign Application Priority Data

Dec. 6, 2005 (JP) ................................. 2005-351481

(51) Int. Cl.
*H01B 1/04* (2006.01)
*H01B 1/12* (2006.01)

(52) U.S. Cl. .................. 252/511; 264/105; 427/122

(58) Field of Classification Search ............... 252/511; 264/105; 427/122
See application file for complete search history.

(56) References Cited

U.S. PATENT DOCUMENTS

| 7,569,619 | B2 * | 8/2009 | Esaki et al. ............ 522/79 |
| 7,645,400 | B2 * | 1/2010 | Saitoh .................. 252/511 |
| 2005/0267230 | A1 * | 12/2005 | Esaki et al. ........... 522/172 |
| 2006/0036045 | A1 * | 2/2006 | Wilson et al. .......... 525/452 |
| 2006/0052509 | A1 * | 3/2006 | Saitoh ................. 524/496 |

FOREIGN PATENT DOCUMENTS

| JP | 46-41602 | 12/1971 |
| JP | 8-305017 | 11/1996 |
| JP | 2004 169028 | 6/2004 |
| JP | 2004 264763 | 9/2004 |
| JP | 2005 24893 | 1/2005 |
| JP | 2005 35810 | 2/2005 |
| JP | 2005 150362 | 6/2005 |
| JP | 2005 220316 | 8/2005 |
| JP | 2005 240014 | 9/2005 |
| JP | 2005 331938 | 12/2005 |
| JP | 2006 225632 | 8/2006 |
| JP | 2006 328311 | 12/2006 |
| TW | I221344 | 9/2004 |
| WO | 02 16257 | 2/2002 |
| WO | 2004 039893 | 5/2004 |
| WO | WO 2005103823 A1 * | 11/2005 |
| WO | 2006 028200 | 3/2006 |

OTHER PUBLICATIONS

Liu, Jie et al., "Fullerene Pipes", Science, vol. 280, pp. 1253-1256, (1998).
Chen, Jian et al., "Solution Properties of Single-Walled Carbon Nanotubes", Science, vol. 282, pp. 95-98, (1998).
Nakashima, Naotoshi et al., "Water-Soluble Single-Walled Carbon Nanotubes via Noncovalent Sidewall-Functionalization with a Pyrene-Carrying Ammonium Ion", Chemistry Letters, pp. 638-639, (2002).
Office Action issued Mar. 29, 2012, in Taiwanese Patent Application No. 095145114, filed Dec. 5, 2006 (with English translation).

* cited by examiner

*Primary Examiner* — Douglas Mc Ginty
(74) *Attorney, Agent, or Firm* — Oblon, Spivak, McClelland, Maier & Neustadt, L.L.P.

(57) ABSTRACT

Disclosed is a carbon nanotube-containing composition which contains a carbon nanotube and a urethane compound obtained by a reaction between a hydroxyl group-containing (meth)acrylate and a isocyanate compound. Also disclosed is a composite having a coating film or a cured film composed of the carbon nanotube-containing composition on at least one surface of a base material. The carbon nanotube-containing composition and the composite are excellent in electrical conductivity, film-formability, moldability, and transparency without deteriorating the characteristic properties of the carbon nanotube itself.

14 Claims, 3 Drawing Sheets

CARBON NANOTUBE-CONTAINING COMPOSITION, COMPOSITE, AND METHODS FOR PRODUCING THEM

TECHNICAL FIELD

The present invention relates to a carbon nanotube-containing composition, a composite, and methods for producing them.

The present application claims the priority of Japanese Patent Application No. 2005-351,481 filed on Dec. 6, 2005, the content of which is incorporated herein by reference.

BACKGROUND ART

In recent years, technologies that deal with materials having nanometer size, namely nanomaterials, have been attracting public attention in various industrial fields. New materials having unprecedented new functions have been developed by combining the nanomaterials with a plurality of other materials at the nanometer level. Since nanomaterials dispersed in high degree show different properties from those in a bulk state and hence they are useful, technology to disperse nanomaterials in a composite is indispensable to obtain the composite in which nanomaterials are dispersed in high degree. However, there is a problem that peculiar functions of nanomaterials cannot be realized since they agglomerate when combined to make composite materials because the surface state of the nanomaterials is generally unstable.

Among the nanomaterials, a carbon nanotube has been studied for its physical properties and functions since its discovery in 1991, and research and development for its application have also been carried out extensively. However, in the case of combining the carbon nanotube with a resin or a solution to make a composite material, there is a problem that its characteristic properties cannot be realized because it further agglomerates from its entangled state when it has been produced. Therefore, various attempts to uniformly disperse or dissolve the carbon nanotube into a solvent or a resin have been tried by carrying out physical treatment or chemical modification on the carbon nanotube. For example, a method of dispersing single-walled carbon nanotube by cutting it shortly through its ultrasonic wave treatment in a strong acid has been proposed (Non-patent Document 1). However, this is not an industrially proper method because the operation is complicated owing to the treatment in the strong acid, and the effect of this method on dispersion is insufficient.

Such a shortly cut single-walled carbon nanotube has open edges, each terminated with an oxygen-containing functional group such as a carboxylic group, and taking account of this, it has been proposed to make the shortly cut single-walled carbon nanotube solubilizable in a solvent by changing the carboxylic group into an acid chloride and reacting the acid chloride with an amine compound to introduce a long chain alkyl group into the shortly cut single-walled carbon nanotube (Non-patent Document 2). However, this method has problems unsolved in which there occurs a damage of a graphene sheet structure of the carbon nanotube and in which characteristic properties of the carbon nanotube itself are affected because the long chain alkyl group is introduced into the single-walled carbon nanotube by a covalent bond.

As another attempt, a method has been reported in which, using the fact that pyrene molecule is adsorbed on the surface of the carbon nanotube through a strong mutual interaction, a substituent group containing an ammonium ion is introduced into the pyrene molecule and the resultant molecule is subjected to ultrasonic treatment in water together with the single-walled carbon nanotube so that the resultant molecule is non-covalently adsorbed on the single-walled carbon nanotube to thereby produce a water soluble single-walled carbon nanotube (Non-patent Document 3). According to this method, the damage of a graphene sheet structure and the like can be suppressed owing to a noncovalent bonding type chemical modification, however, there is a problem that electrical conductivity of the carbon nanotube is lowered caused by the existence of a nonconductive pyrene compound.

A method has been proposed in which a dispersion liquid is obtained by dispersing or solubilizing the carbon nanotube in a solvent such as water or an organic solvent without deteriorating the characteristic properties of the carbon nanotube itself using a general-purpose surfactant or polymer dispersant (Patent Document 1 and Patent Document 2). There is a description that the carbon nanotube is stably dispersed in the dispersion liquid, however, there is no description about a dispersed state of the carbon nanotube in a coating film or a composite to be formed from the dispersion liquid or about an application to a conductive material or the like.

Further, there has been proposed a composition composed of carbon nanotube, a conductive polymer, and a solvent, and a composite produced from it (Patent Document 3). It is reported that the composition and the composite can disperse or solubilize the carbon nanotube in a solvent such as water, an organic solvent, or a water-containing organic solvent and can be excellent in long-term storage stability without deteriorating the characteristic properties of the carbon nanotube itself by the coexistence of the conductive polymer. The carbon nanotube composition in which the conductive polymer coexists is excellent in electrical conductivity, film-formability, and moldability and can be applied or coated on a base material with an easy method, however, application to materials that need colorlessness and transparency is difficult owing to a coloring originated from the conductive polymer to be used. Further, there has been a problem that usable solvents are limited because the conductive polymer generally has low solubilities to various solvents.

Further, there has been proposed a composition composed of a nanomaterial, a (meth)acrylic polymer, and a solvent, and a composite produced from it (Patent Document 4). It is reported that the composition and the composite can disperse or solubilize the nanomaterial in a solvent such as water, an organic solvent, or a water-containing organic solvent and can be excellent in long-term storage stability without deteriorating the characteristic properties of the nanomaterial itself by the coexistence of the (meth)acrylic polymer. The nanomaterial composition in which the (meth)acrylic polymer coexists is excellent in film-formability and moldability and can be applied or coated on a base material with an easy method, however, there is a problem that an usable solvent is limited because an amine compound has to be jointly used to raise dispersibility. Further, in the case of using the nanomaterial composition as a coating film (cured film) by adding it to a polymerizable monomer, there has been a problem that water resistance and mar resistance as a coating film are lowered since the nanomaterial composition has no crosslinking point with the film component because the nanomaterial composition is a compound containing sulfonic group and the like.

Further, there has been proposed a photosensitive composition for a black matrix, composed of a binder resin containing a urethane acrylate compound obtained by a reaction between an isocyanate compound and a polyhydroxy compound and a black pigment such as carbon black or carbon nanotube (Patent Document 5). It is described that the photosensitive composition containing the urethane acrylate compound can produce the black matrix at a low cost because it can easily form a pattern having a high light blocking effect with a thin film and has a high sensitivity and a high curing speed, however, there is no description about a dispersion effect of the carbon nanotube and an additional dispersant is separately added to disperse the black pigment. Further, the black matrix has to realize the light blocking effect by a coating film obtained from a composition containing a black pigment, and hence, in the case of applying the composition to a use where transparency is required, a dispersion level of the carbon nanotube is low and accordingly a coating film having a sufficient transparency cannot be obtained. Further, there is a problem that nothing is described concerning an effect of improving electrical conductivity obtained by sufficiently dispersing the carbon nanotube.

Patent Document 1: International Publication No. WO 2002/016257
Patent Document 2: Japanese Patent Application Laid-Open No. 2005-35810
Patent Document 3: International Publication No. WO 2004/039893
Patent Document 4: International Publication No. WO 2006/028200
Patent Document 5: Japanese Patent Application Laid-Open No. 2005-331938
Non-patent Document 1: R. E. Smalley, et. al., Science, 280, 1253 (1998)
Non-patent Document 2: J. Chen, et. al., Science, 282, 95 (1998)
Non-patent Document 3: Nakajima, et. al., Chem. Lett., 638 (2002)

DISCLOSURE OF INVENTION

Problem to be Solved by the Invention

It is an object of the present invention to provide a carbon nanotube-containing composition: in which the carbon nanotube can be dispersed or solubilized in at least one of a solvent such as water, an organic solvent, or a water-containing organic solvent and a polymerizable monomer without deteriorating the characteristic properties of the carbon nanotube itself and does not separate or agglomerate in the case of a long-term storage; which is excellent in electrical conductivity, film-formability, and moldability; which can be applied or coated on a base material with an easy method; and a coating film or a cured film of which has high transparency and is excellent in water resistance, weather resistance, adhesion properties to a base material, mechanical strength, thermal conductivity, and hardness. It is another object of the present invention to provide a composite having a coating film or a cured film comprising the carbon nanotube-containing composition. It is another object of the present invention to provide a method for producing the carbon nanotube-containing composition and the composite.

Means for Solving the Problem

The present inventors have diligently researched in order to solve the above-mentioned subjects and found that a urethane compound (b) which is a reaction product of a hydroxyl group-containing (meth)acrylate (b-1) and an isocyanate compound (b-2) can disperse and solubilize carbon nanotube, and thus have completed the present invention. Namely, the present invention is:

(1) A carbon nanotube-containing composition comprising: a carbon nanotube (a); and
a urethane compound (b) which is a reaction product of a hydroxyl group-containing (meth)acrylate (b-1) and an isocyanate compound (b-2).

(2) The carbon nanotube-containing composition according to (1), further comprising a polymerizable monomer (c-1).

(3) The carbon nanotube-containing composition according to (2), further comprising one of a photopolymerization initiator (d-1) and a thermal polymerization initiator (d-2).

(4) The carbon nanotube-containing composition according to any one of (1) to (3), further comprising a solvent (c-2).

(5) The carbon nanotube-containing composition according to any one of (1) to (4), wherein the hydroxyl group-containing (meth)acrylate (b-1) is represented by at least one of the following general formula (1),

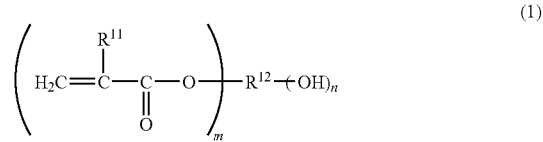

wherein $R^{11}$ represents hydrogen atom or methyl group, $R^{12}$ represents a hydrocarbon group having 2 to 24 carbon atoms, which may contain an ether bond, and m and n represent an integer, respectively, which is 1 or more while a sum of m and n is the number of the carbon atoms of $R^{12}$ or less; and the following general formula (2),

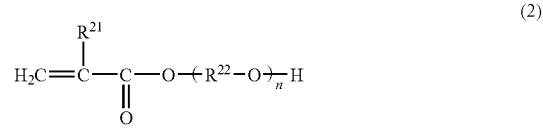

wherein $R^{21}$ represents hydrogen atom or methyl group. $R^{22}$ represents an alkylene group having 2 to 24 carbon atoms, an arylene group having 1 to 24 carbon atoms, or an aralkylene group having 1 to 24 carbon atoms, and n represents an integer of 1 to 100.

(6) The carbon nanotube-containing composition according to any one of (1) to (5), wherein the isocyanate compound (b-2) is at least one of a diisocyanate compound and a triisocyanate compound.

(7) The carbon nanotube-containing composition according to any one of (1) to (5), wherein the isocyanate compound (b-2) is represented by at least one of the following general formula (3),

wherein $R^{31}$ represents hydrogen atom or an alkyl group having 1 to 8 carbon atoms and n represents an integer of 1 to 25 while $R^{31}$ that substitutes each (substituted) methylene group may be the same or not the same when n is 2 or more; the following general formula (4),

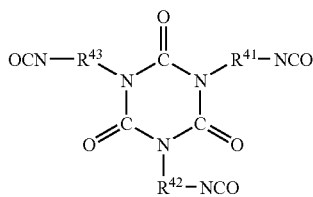

(4)

wherein $R^{41}$ to $R^{43}$ respectively independently represent a divalent group selected from an alkylene group, an arylene group, and an aralkylene group each having 1 to 24 carbon atoms; and the following general formula (5).

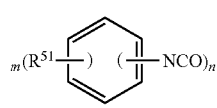

(5)

wherein $R^{51}$ represents a group selected from an alkyl group, an aryl group, and an aralkyl group each having 1 to 24 carbon atoms, m is an integer of 0 to 4 while $R^{51}$ may be the same or not the same when m is 2 or more, and n is an integer of 2 to 6 while the sum of m and n is an integer of 6 or less.

(8) A method for producing the carbon nanotube-containing composition according to any one of (1) to (7), comprising the step of irradiating ultrasonic waves on a mixture obtained by mixing respective raw materials.

(9) A method for producing a composite, comprising the steps of:
coating the carbon nanotube-containing composition according to any one of (1) to (7) on at least one surface of a base material; and
forming a coating film by carrying out at least one of leaving the composition to stand at an ordinary temperature, subjecting the composition to heat treatment, and applying photoirradiation to the composition.

(10) A method for producing a composite, comprising the steps of:
coating the carbon nanotube-containing composition according to any one of (1) to (7) on an inside surface of a mold followed by curing the composition to form a cured film;
pouring one of a polymerizable raw material or a molten resin into the mold followed by solidifying it to make a base material; and
stripping the base material together with the cured film from the mold.

(11) A composite, comprising a coating film or a cured film on at least one surface of a base material, wherein the coating film or the cured film is formed by coating the carbon nanotube-containing composition according to any one of (1) to (7)
on at least one surface of the base material followed by carrying out at least one of leaving the composition to stand at an ordinary temperature, subjecting the composition to heat treatment, and applying photoirradiation to the composition.

(12) A composite obtained by coating the carbon nanotube-containing composition according to any one of (1) to (7) on an inside surface of a mold followed by curing the composition to form a cured film, pouring one of a polymerizable raw material and a molten resin into the mold followed by solidifying it to make a base material, and stripping the base material together with the cured film from the mold.

(13) The composite according to (11) or (12), wherein the total light transmittance of the composite is 50% or more.

(14) The composite according to (11) or (12), wherein the composite is one of a transparent conductive film, a transparent conductive sheet, and a transparent conductive molded article.

Effect of the Invention

With respect to the carbon nanotube-containing composition of the present invention, the carbon nanotube can be dispersed or solubilized in an organic solvent, a water-containing organic solvent, water, or a polymerizable monomer without deteriorating the characteristic properties of the carbon nanotube itself and does not separate or agglomerate in the case of a long-term storage. Further, a coating film having high electrical conductivity, suppressed coloring, high transparency, and excellent adhesion properties to a base material can be formed by coating the carbon nanotube-containing composition of the present invention on the base material. The coating film is also excellent in water resistance, weather resistance, hardness, mar resistance, mechanical strength, and thermal conductivity.

BEST MODE FOR CARRYING OUT THE INVENTION

Figure 1:
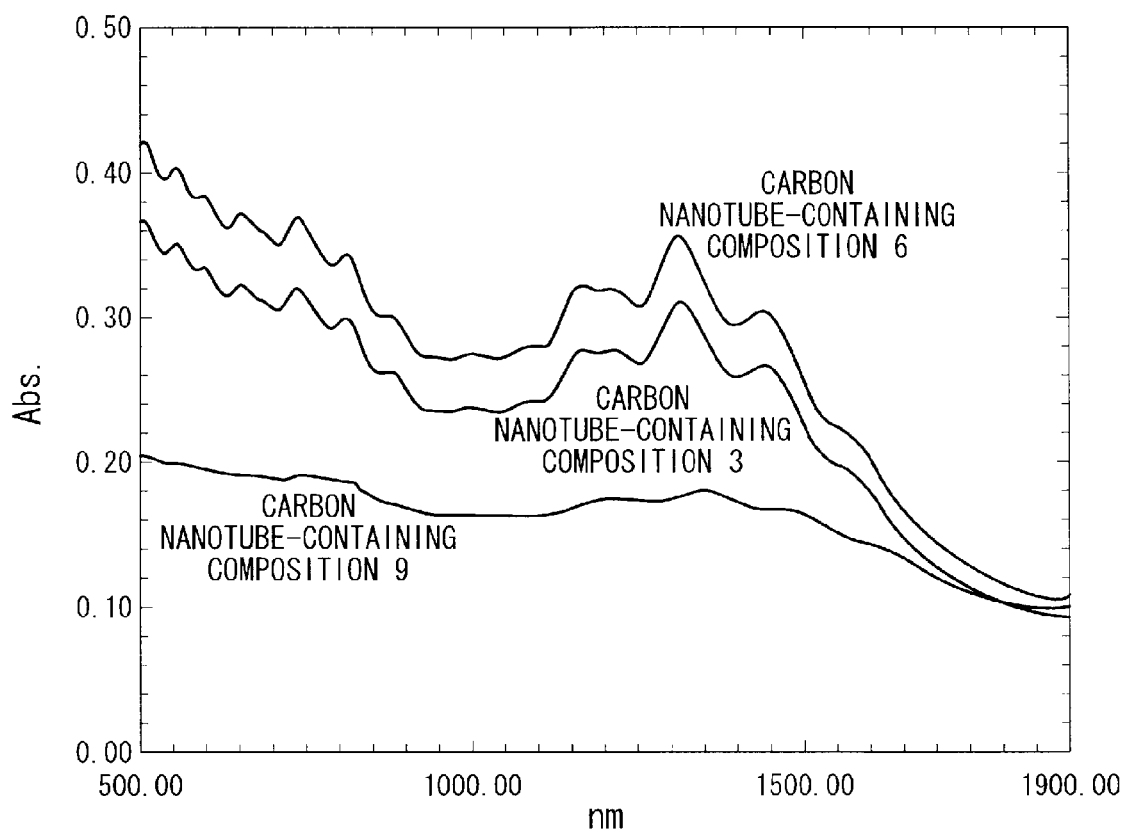
FIG. 1: A near infrared absorption spectrums of a carbon nanotube-containing composition prepared by using a single-walled carbon nanotube (Example 3, Example 6, and Comparative Example 2).

Hereinafter, the present invention will be explained in detail. In the present invention, "(meth)acrylate" means "at least one of acrylate and methacrylate". Further, "(meth) acryl" means "at least one of acryl and methacryl", and "(meth)acryloyl" means "at least one of acryloyl and methacryloyl".

<Carbon Nanotube (a)>

The carbon nanotube (a) is, for example, a cylinder formed by rolling up a carbon atomic plane of graphite having a thickness of several atomic layers or a substance having a nested structure of a plurality of the foregoing cylinders, which is an extremely small material having an outside radius of the order of nm.

As the carbon nanotube (a), an ordinary carbon nanotube, namely, a single-walled carbon nanotube, a multi-walled carbon nanotube having several layers in concentric circles, a coil carbon nanotube in which these carbon nanotubes are formed in coil shape, a carbon nanohorn having a structure in which one end of the carbon nanotube is closed, a cup-stacked carbon nanotube having a structure of stacking cups without bottoms, a carbon nanotube (a) analogue such as fullerene or carbon nanofiber, or the like can be listed.

As a method for producing the carbon nanotube (a), a catalytic hydrogen reduction of carbon dioxide, an arc discharge method, a laser evaporation method, a chemical vapor deposition method (CVD method), a vapor-phase epitaxy method, a HiPco method in which carbon monoxide is reacted together with an iron catalyst to grow the carbon nanotube (a) in vapor phase, or the like can be listed. Among the carbon nanotube (a) obtained by these production methods, the single-walled carbon nanotube and the multi-walled carbon nanotube are preferable in order to sufficiently realize various functions, and moreover, it is preferable to still more purify them by various refining methods such as a washing method, a centrifugation method, a filtration method, an oxidation method, and a chromatographic method.

The carbon nanotube (a) may be pulverized using a ball type mixer such as a ball mill, a vibration mill, a sand mill, or a roll mill, and may be cut shortly by a chemical or physical treatment.

<Urethane Compound (b)>

The urethane compound (b) in the present invention is not particularly limited as long as it is a reaction product of a hydroxyl group-containing (meth)acrylate (b-1) and an isocyanate compound (b-2). Further, there can be at least one urethane bond in the urethane compound (b). When there are two or more urethane bonds in the urethane compound (b), functional groups that combine with respective urethane bonds may be the same or different from each other. Such a urethane compound (b) can be a cationic, anionic, nonionic, or amphoteric compound, and may be a compound with a silicon base or fluorine base urethane bond having silicon atom or fluorine atom in its structure.

<Hydroxyl Group-Containing (meth)acrylate (b-1)>

The hydroxyl group-containing (meth)acrylate (b-1) that can be used in the present invention is not particularly limited as long as it is a compound having a hydroxyl group and a (meth)acrylate group in its molecule. For example, it is preferably a compound represented by at least one of the foregoing general formulae (1) and (2).

For example, as a compound having one hydroxyl group and one (meth)acrylate group, 1-hydroxyethyl (meth)acrylate, 2-hydroxyethyl (meth)acrylate, 2-hydroxypropyl (meth)acrylate, 2-hydroxy-1,1-dimethylethyl (meth)acrylate, 3-hydroxypropyl (meth)acrylate, 2-hydroxy-1-methylethyl (meth)acrylate, 3-hydroxy-2-methylpropyl (meth)acrylate, 2-hydroxy-2-methylpropyl (meth)acrylate, 1-(hydroxymethyl)propyl (meth)acrylate, hydroxybutyl (meth)acrylate, 3-hydroxybutyl (meth)acrylate, 2-hydroxy-1-methylpropyl (meth)acrylate, 3-hydroxy-1-methylpropyl (meth)acrylate, 4-hydroxybutyl (meth)acrylate, 2-hydroxypentyl (meth)acrylate, 6-hydroxyhexyl (meth)acrylate, 2-hydroxyhexyl (meth)acrylate, 2-hydroxyheptyl (meth)acrylate, 2-hydroxyoctyl (meth)acrylate, 2-[(6-hydroxyhexanoyl)oxy]ethyl (meth)acrylate, 2-hydroxy-3-methoxypropyl (meth)acrylate, 3-butoxy-2-hydroxypropyl (meth)acrylate, 9-hydroxy-10-methoxydecyl (meth)acrylate, 2,2-dimethyl-3-hydroxypropyl (meth)acrylate, 3-hydroxybutyl (meth)acrylate, 3-methyl-3-hydroxybutyl (meth)acrylate, 1-methyl-3-hydroxypropyl (meth)acrylate, 2-(2-hydroxyethoxy)ethyl (meth)acrylate, 2-[2-(2-hydroxyethoxy)ethoxy]ethyl (meth)acrylate, 2-{2-[2-(2-hydroxyethoxy)ethoxy]ethoxy}ethyl (meth)acrylate, decaethylene glycol (meth)acrylate, trideca-ethylene glycol (meth)acrylate, 17-hydroxy-3,6,9,12,15-pentaoxaheptadecan-1-yl (meth)acrylate, 20-hydroxy-3,6,9,12,15,18-hexaoxaicosan-1-yl (meth)acrylate, 2-methyl-2-(3-hydroxy-2,2-dimethylpropoxycarbonyl)propyl (meth) acrylate, 3-[3-(3-hydroxypropyl)-3-oxopropoxy]-3-oxopropyl (meth)acrylate, 2-hydroxy-3-allyloxypropyl (meth)acrylate, 1-phenyl-2-hydroxyethyl (meth)acrylate, 4-hydroxyphenyl (meth)acrylate, 2-hydroxy-3-phenoxypropyl (meth)acrylate, 2-(4-hydroxyphenyl)ethyl (meth)acrylate, 2-[(2-hydroxybenzyl)oxy]ethyl (meth)acrylate, 2-(4-hydroxyphenoxy)ethyl (meth)acrylate, 3-hydroxy-4-acetylphenyl (meth)acrylate, 4-(hydroxymethyl)cyclohexylmethyl (meth)acrylate, 3-hydroxy-4-benzoylphenyl (meth)acrylate, 1-(hydroxymethyl)tridecyl (meth)acrylate, 10-hydroxydecyl (meth)acrylate, or 2-hydroxytetradecyl (meth)acrylate can be listed.

For example, as a compound having one (meth)acrylate group and two or more hydroxyl groups, 3,4-dihydroxybutyl (meth)acrylate, 2,2-bis(hydroxymethyl)butyl (meth)acrylate, 2-hydroxy-1-hydroxymethylethyl (meth)acrylate, 1,1-bis(hydroxymethyl)ethyl (meth)acrylate, 2,3-dihydroxypropyl (meth)acrylate, 2,3-dihydroxybutyl (meth)acrylate, 2-hydroxy-1-hydroxymethylpropyl (meth)acrylate, 3-hydroxy-2-(hydroxymethyl)propyl (meth)acrylate, 2,3-dihydroxy-1-methylpropyl (meth)acrylate, 2,4-dihydroxybutyl (meth)acrylate, 2-methyl-3-hydroxy-2-(hydroxymethyl)propyl (meth)acrylate, 2,3-dihydroxy-2-methylpropyl (meth)acrylate, 3-hydroxy-1-(hydroxymethyl)propyl (meth)acrylate, 9,10-dihydroxydecyl (meth)acrylate, 2,3-dihydroxy-2-(hydroxymethyl)propyl (meth)acrylate, 2-hydroxy-1,1-bis(hydroxymethyl)ethyl (meth)acrylate, pentaerythritol mono (meth)acrylate, 2,3,4-trihydroxybutyl (meth)acrylate, or 1-(hydroxymethyl)-2,3-dihydroxypropyl (meth)acrylate can be listed.

For example, as a compound having two or more (meth)acrylate groups and at least one hydroxyl group, 2-hydroxytrimethylene di(meth)acrylate, 2-hydroxy-2-methyltrimethylene di(meth)acrylate, 2-hydroxymethyl-2-methyl-1,3-propanediyl bis(meth)acrylate, 2-ethyl-2-(hydroxymethyl)trimethylene di(meth)acrylate, 2-(hydroxymethyl)-1,3-propanediyl di(meth)acrylate, 2-hydroxy-1-methyl-1,3-propanediyl bis(meth)acrylate, 1-(2-hydroxyethyl)-1,2-ethanediyl bis(meth)acrylate, 1-hydroxymethyl-1,2-ethanediyl bis(meth)acrylate, 1-(1-hydroxyethyl)-1,2-ethanediyl bis(meth)acrylate, 1-hydroxymethyl-2-methyl-1,2-ethanediyl bis(meth)acrylate, 1-(hydroxymethyl)-1-methylethyle bis(meth)acrylate, 2-hydroxy-1,4-butanediyl bis(meth)acrylate, 1-(hydroxymethyl)-1,3-propanediylbis(meth)acrylate, 2-hydroxy-1,6-hexanediylbis(meth)acrylate, 1-(2-hydroxypropoxymethyl)ethylenebis[oxy(1-methyl-2,1-ethanediyl)]bis(meth)acrylate, 2-(2-hydroxypropoxy)-1,3-propanediylbis[oxy(1-methyl-2,1-ethanediyl)], 8-(2-hydroxypropoxy)-1,4,12-trimethyl-14-oxo-3,6,10,13-tetraoxa-15-hexadecene-1-yl (meth)acrylate, 2-hydroxy-3-[(2-methyl-1-oxo-2-propenyl)oxy]propyl (meth)acrylate, pentaerythritol tri(meth)acrylate, 2-(hydroxymethyl)propane-1,2,3-triyl tris(meth)acrylate, 2-(acryloyloxymethyl)-2-hydroxypropane-1,3-diyl bis(meth)acrylate, 3-(hydroxymethyl)propane-1,2,3-triyltris(meth)acrylate, 3-hydroxybutane-1,2,4-triyl tris(meth)acrylate, 3-[2,2-bis[((meth)acryloyloxy)methyl]-3-hydroxypropoxy]-2,2-bis[((meth)acryloyloxy)methyl]propyldipentaerythritol penta(meth)acrylate, or 2-{[2-(hydroxymethyl)-2-[((meth)acryloyloxy)methyl]-3-((meth)acryloyloxy)propyl]oxy}methyl)-2-[((meth)acryloyloxy)methoxy]propane-1,3-diyl bis(meth)acrylate can be listed.

For example, as a compound having two or more (meth)acrylate groups and two or more hydroxyl groups, 2,3-dihydroxybutane-1,4-diyl bis(meth)acrylate, 2-hydroxy-2-(hydroxymethyl)propane-1,3-diyl bis(meth)acrylate, 2,2-bis(hydroxymethyl)-1,3-propanediyl di(meth)acrylate, 2-hydroxy-3-(hydroxymethyl)propane-1,3-diyl bis(meth)acrylate, 1,1-bis(hydroxymethyl)ethylene bis(meth)acrylate, 1-(1,2-dihydroxyethyl)ethane-1,2-diyl bis(meth)acrylate, 1,2-bis(hydroxymethyl)ethylene bis(meth)acrylate, 1,6-hexanediylbis(oxy)bis(2-hydroxy-3,1-propanediyl)bis(meth)acrylate, (2,11-dihydroxy-4,9-dioxadodecane)-1,12-diyl bis(meth)acrylate, 2,9-dihydroxy-4,7-dioxadecane-1,10-diyl bis(meth)acrylate, or 3,3'-(1,3-phenylenebisoxy)bis(2-hydroxypropyl) di(meth)acrylate can be listed.

These compounds may be used alone or in combination of two or more kinds.

Among the foregoing compounds of the hydroxyl group-containing (meth)acrylate (b-1), 2-hydroxyethyl (meth)acrylate, 2-hydroxypropyl (meth)acrylate, 2-hydroxytrimethylene di(meth)acrylate, pentaerythritol tri(meth)acrylate, 2-(2-hydroxyethoxy)ethyl (meth)acrylate, 8-hydroxy-3,6-dioxaoctane-1-yl (meth)acrylate, 2-{2-[2-(2-hydroxyethoxy)ethoxy]ethoxy}ethyl (meth)acrylate, decaethylene glycol (meth)acrylate, undecaethylene glycol (meth)acrylate, dodecaethylene glycol (meth)acrylate, tridecaethylene glycol (meth)acrylate, 17-hydroxy-3,6,9,12,15-pentaoxaheptadecane-1-yl (meth)acrylate, and 20-hydroxy-3,6,9,12,15,18-hexaoxaicosane-1-yl (meth)acrylate are particularly preferably used. These compounds may be used alone or in combination of two or more kinds.

<Isocyanate Compound (b-2)>

The isocyanate compound (b-2) that can be used in the present invention is not particularly limited as long as it is a compound of at least one of an isocyanate, a diisocyanate, a triisocyanate and a polyisocyanate, however, it is preferably at least one of the diisocyanate and the triisocyanate.

As the foregoing isocyanate, for example, phenyl isocyanate, tolyl isocyanate, naphthyl isocyanate, or vinyl isocyanate can be listed.

As the foregoing diisocyanate, an aliphatic diisocyanate such as ethylene diisocyanate, propylene diisocyanate, butylene diisocyanate, pentamethylene diisocyanate, hexamethylene diisocyanate, octamethylene diisocyanate, lysine methyl ester diisocyanate, 2,4,4-trimethylhexamethylene diisocyanate, or a dimeric acid diisocyanate, an alicyclic diisocyanate such as isophorone diisocyanate, 4,4'-methylenebis(cyclohexylisocyanate), or ω,ω'-diisocyanate dimethylcyclohexane, an aliphatic diisocyanate having an aromatic ring such as xylylene diisocyanate or α,α,α',α'-tetramethylxylylene diisocyanate, or an aromatic diisocyanate like a benzene diisocyanate such as benzene-1,3-diisocyanate or benzene-1,4-diisocyanate; a toluene diisocyanate such as toluene-2,4-diisocyanate, toluene-2,5-diisocyanate, toluene-2,6-diisocyanate, or toluene-3,5-diisocyanate; or a xylene diisocyanate such as 1,2-xylene-3,5-diisocyanate, 1,2-xylene-3,6-diisocyanate, 1,2-xylene-4,6-diisocyanate, 1,3-xylene-2,4-diisocyanate, 1,3-xylene-2,5-diisocyanate, 1,3-xylene-2,6-diisocyanate, 1,3-xylene-4,6-diisocyanate, 1,4-xylene-2,5-diisocyanate, or 1,4-xylene-2,6-diisocyanate can be listed.

As the foregoing triisocyanate, for example, an aromatic triisocyanate like a benzene triisocyanate such as benzene-1,2,4-triisocyanate, benzene-1,2,5-triisocyanate, or benzene-1,3,5-triisocyanate: a toluene triisocyanate such as toluene-2,3,5-triisocyanate, toluene-2,3,6-triisocyanate, toluene-2,4,5-triisocyanate, toluene-2,4,6-triisocyanate, toluene-3,4,6-triisocyanate, or toluene-3,5,6-triisocyanate; or a xylene triisocyanate such as 1,2-xylene-3,4,6-triisocyanate, 1,2-xylene-3,5,6-triisocyanate, 1,3-xylene-2,4,5-triisocyanate, 1,3-xylene-2,4,6-triisocyanate, 1,3-xylene-3,4,5-triisocyanate, 1,4-xylene-2,3,5-triisocyanate, or 1,4-xylene-2,3,6-triisocyanate, or an aliphatic, an alicyclic, or a heteroatom-containing triisocyanate such as lysine ester triisocyanate, 1,6,11-undecane triisocyanate, 1,8-diisocyanate-4-isocyanatemethyloctane, 1,3,6-hexamethylene triisocyanate, bicycloheptan triisocyanate, tris(isocyanatephenylmethane), or tris(isocyanatephenyl)thiophosphate can be listed.

As the foregoing polyisocyanate, for example, a trimer of the foregoing diisocyanate or triisocyanate and a polyol adduct of each of them can be listed.

As the foregoing at least one of the diisocyanate and the triisocyanate, the isocyanate compound represented by the foregoing at least one of the general formula (3), general formula (4), and general formula (5) can be listed as a preferable example.

As the compound which is represented by the foregoing general formula (3) and has two isocyanate groups in a molecule, for example, ethylene diisocyanate, propylene diisocyanate, butylenes diisocyanate, trimethylene diisocyanate, tetramethylene diisocyanate, pentamethylene diisocyanate, hexamethylene diisocyanate, or octamethylene diisocyanate can be listed.

As the compound which is represented by the foregoing general formula (4) and has three isocyanate groups in a molecule, the one composed of a trimer of a compound having two isocyanate groups in a molecule is preferable. As the compound having two isocyanate groups in a molecule, the foregoing various diisocyanates can be used.

As the aromatic isocyanate compound represented by the foregoing general formula (5), benzene-1,3-diisocyanate, benzene-1,4-diisocyanate, toluene-2,4-diisocyanate, toluene-2,5-diisocyanate, toluene-2,6-diisocyanate, toluene-3,5-diisocyanate, 1,2-xylene-3,5-diisocyanate, 1,2-xylene-3,6-diisocyanate, 1,2-xylene-4,6-diisocyanate, 1,3-xylene-2,4-diisocyanate, 1,3-xylene-2,5-diisocyanate, 1,3-xylene-2,6-diisocyanate, 1,3-xylene-4,6-diisocyanate, 1,4-xylene-2,5-diisocyanate, 1,4-xylene-2,6-diisocyanate, or the like can be listed.

Among the foregoing isocyanate compounds, hexamethylene diisocyanate, hexamethylene diisocyanate trimer, toluene-2,4-diisocyanate, toluene-2,5-diisocyanate, toluene-2,6-diisocyanate, toluene-3,5-diisocyanate, 1,2-xylene-3,5-diisocyanate, 1,2-xylene-3,6-diisocyanate, 1,2-xylene-4,6-diisocyanate, 1,3-xylene-2,4-diisocyanate, 1,3-xylene-2,5-diisocyanate, 1,3-xylene-2,6-diisocyanate, 1,3-xylene-4,6-diisocyanate, 1,4-xylene-2,5-diisocyanate, and 1,4-xylene-2,6-diisocyanate are particularly preferably used. These compounds may be used alone or in combination of two or more kinds.

Among the foregoing compounds of the urethane compound (b), the one which is a reaction product of a hydroxyl group-containing (meth)acrylate (b-1) represented by the foregoing general formulae (1) and (2) and an isocyanate compound (b-2) represented by the foregoing general formulae (3), (4), and (5) is particularly preferably used. The urethane compound (b) has a function as a polymerizable monomer as well, and is particularly effective in the case of dispersing the carbon nanotube (a) in the polymerizable monomer (c-1), in the present invention.

The foregoing compounds of the urethane compound (b) may be used alone or in combination of two or more kinds. Further, the urethane compound (b) may be used in combination with another urethane compound (b).

<Polymerizable Monomer (c-1)>

The polymerizable monomer (c-1) may be the one which dissolves the urethane compound (b) except the foregoing urethane compound (b), and disperses or dissolves the carbon nanotube (a) by an action of the urethane compound (b).

As the polymerizable monomer (c-1), (meth)acrylic acid, a (meth)acrylate, a (meth)acrylic compound having two or more polymerizable groups, styrene, methyl styrene, bromostyrene, vinyl toluene, divinylbenzene, vinyl acetate, N-vinyl caprolactam, N-vinyl pyrrolidone, or the like can be listed. Among these compounds, (meth)acrylic acid, a (meth)

acrylate, and a (meth)acrylic compound having two or more polymerizable groups are preferable from the viewpoint of transparency, impact resistance, mar resistance, and moldability of a cured film of a curable resin composition.

As the (meth)acrylate, methyl (meth)acrylate, ethyl (meth)acrylate, propyl (meth)acrylate, isopropyl (meth)acrylate, n-butyl (meth)acrylate, i-butyl (meth)acrylate, t-butyl (meth)acrylate, n-hexyl (meth)acrylate, cyclohexyl (meth)acrylate, lauryl (meth)acrylate, tridecyl (meth)acrylate, stearyl (meth)acrylate, 2-ethylhexyl (meth)acrylate, phenyl (meth)acrylate, benzyl (meth)acrylate, isobornyl (meth)acrylate, glycidyl (meth)acrylate, tetrahydrofuryl (meth)acrylate, dimethylaminoethyl (meth)acrylate, diethylaminoethyl (meth)acrylate, (meth)acrylic acid ethyltrimethyl ammonium chloride, 2-hydroxyethyl (meth)acrylate, hydroxypropyl (meth)acrylate, methoxyethyl (meth)acrylate, ethoxyethyl (meth)acrylate, 1,4-butanediol (meth)acrylate, or the like can be listed.

As the (meth)acrylic compound having two or more polymerizable groups, (i) an ester compound obtained by reacting 1 mole of a polyol with two moles or more of (meth)acrylic acid or its derivative; (ii) a linear ester compound which has two or more (meth)acryloyloxy groups in a molecule and is obtained from a polyol, a polyvalent carboxylic acid or its anhydride, and (meth)acrylic acid or its derivative; (iii) a poly[(meth)acryloyloxyethyl]isocyanurate; (iv) an epoxypolyacrylate; or the like can be listed.

As the ester compound (i), di(meth)acrylate of polyethylene glycol, 1,4-butanediol di(meth)acrylate, 1,6-hexanediol di(meth)acrylate, 1,9-nonanediol di(meth)acrylate, trimethylolpropane tri(meth)acrylate, trimethylolethane tri(meth)acrylate, pentaerythritol tri(meth)acrylate, pentaerythritol tetra(meth)acrylate, glycerin tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate, or the like can be listed.

As a preferable combination of a polyvalent carboxylic acid or its anhydride/a polyol/(meth)acrylic acid in the ester compound (II), malonic acid/trimethylolethane/(meth)acrylic acid, malonic acid/trimethylolpropane/(meth)acrylic acid, malonic acid/glycerin/(meth)acrylic acid, malonic acid/pentaerythritol/(meth)acrylic acid, succinic acid/trimethylolethane/(meth)acrylic acid, succinic acid/trimethylolpropane/(meth)acrylic acid, succinic acid/glycerin/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/glycerin/(meth)acrylic acid, adipic acid/pentaerythritol/(meth)acrylic acid, glutaric acid/trimethylolethane/(meth)acrylic acid, glutaric acid/trimethylolpropane/(meth)acrylic acid, glutaric acid/glycerin/(meth)acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerin/(meth)acrylic acid, sebacic acid/pentaerythritol/(meth)acrylic acid, fumaric acid/trimethylolethane/(meth)acrylic acid, fumaric acid/trimethylolpropane/(meth)acrylic acid, fumaric acid/glycerin/(meth)acrylic acid, fumaric acid/pentaerythritol/(meth)acrylic acid, itaconic acid/trimethylolethane/(meth)acrylic acid, itaconic acid/trimethylolpropane/(meth)acrylic acid, itaconic acid/glycerin/(meth)acrylic acid, itaconic acid/pentaerythritol/(meth) acrylic acid, maleic anhydride/trimethylolethane/(meth)acrylic acid, maleic anhydride/trimethylolpropane/(meth) acrylic acid, maleic anhydride/glycerin/(meth)acrylic acid, maleic anhydride/pentaerythritol/(meth)acrylic acid, or the like can be listed.

As the poly[(meth)acryloyloxyethyl]isocyanurate (iii), a di(meth)acrylate or tri(meth)acrylate of tris(2-hydroxyethyl) isocyanuric acid, or the like can be listed.

The polymerizable monomer (c-1) may be used alone or in combination of two or more kinds.

<Solvent (c-2)>

The solvent (c-2) is not particularly limited as long as it dissolves another urethane compound (b) and disperses or dissolves the carbon nanotube (a). For example, water; an organic solvent such as methanol, ethanol, isopropanol, benzene, toluene, xylene, acetone, methyl ethyl ketone, dimethoxyethane, tetrahydrofuran, chloroform, carbon tetrachloride, dichloroethylene, ethyl acetate, N,N-dimethylformamide, dimethylacetamide, dimethyl sulfoxide, or the like; and a water-containing organic solvent can be used.

These solvents may be used alone or in combination of two or more kinds.

<Photopolymerization Initiator (d-1)>

As the photopolymerization initiator (d-1), a carbonyl compound such as benzoin, benzoin methyl ether, benzoin ethyl ether, benzoin isopropyl ether, benzoin isobutyl ether, acetoin, butyroin, toluoin, benzil, benzophenone, p-methoxybenzophenon, 2,2-diethoxyacetophenon, α,α-dimethoxy-α-phenylacetophenon, methylphenylglyoxylate, ethylphenylglyoxylate, 4,4'-bis(dimethylamino)benzophenon, or 2-hydroxy-2-methyl-1-phenylpropane-1-on; a sulfur compound such as tetramethylthiuram monosulfide or tetramethylthiuram disulfide; 2,4,6-trimethylbenzoyl diphenylphosphinoxide, or benzoyl diethoxyphosphinoxide can be listed. The photopolymerization initiator may be used alone or in combination of two or more kinds.

<Thermal Polymerization Initiator (d-2)>

As the thermal polymerization initiator (d-2), a thermal polymerization initiator such as an azo compound or an organic peroxide can be listed.

As the azo compound, 2,2'-azobis(isobutyronitrile), 2,2'-azobis(2,4-dimethylvaleronitrile), 2,2'-azobis(isobutyric acid)dimethyl, 4,4'-azobis(4-cyanovaleric acid), 2,2'-azobis (2-amidinopropane)dihydrochloride, or 2,2'-azobis{2-methyl-N-[2-(1-hydroxybutyl)]-propionamide} can be listed.

As the organic peroxide, benzoyl peroxide or lauroyl peroxide can be listed.

The thermal polymerization initiator may be used alone or in combination of two or more kinds.

<Polymer Compound (e)>

When the polymer compound (e) is used in the carbon nanotube-containing composition of the present invention, adhesion properties to a base material and mechanical strength of the resultant coating film are further improved. The polymer compound (e) that can be used in the present invention is not particularly limited as long as it can be dissolved or dispersed (emulsified) in at least one of the urethane compound (b), the polymerizable monomer (c-1), and the solvent (c-2), and as long as it is not the urethane compound (b). Concretely, as the polymer compound (e), a polyvinyl alcohol such as polyvinyl alcohol, polyvinyl formal, or polyvinyl butyral; a poly(meth)acrylate such as polymethyl methacrylate, polybutyl methacrylate, or polymethyl acrylate, a poly(meth)acrylic acid such as polyacrylic acid, polymethacrylic acid, a polyacrylic acid salt, or a polymethacrylic acid salt; a polyacrylamide such as polyacrylamide or poly (N-t-butylacrylamide); polyvinylpyrrolidone, polystyrene sulfonic acid or its sodium salt, a cellulose, an alkyd resin, a melamin resin, a urea resin, a phenolic resin, an epoxy resin, a polybutadiene resin, an acrylic resin, a vinylester resin, a urea resin, a polyimide resin, a maleic resin, a polycarbonate resin, a vinyl acetate resin, a chlorinated polyethylene resin, a chlorinated polypropylene resin, a styrene resin, an acrylonitrile-styrene copolymer resin, a vinyl acetate-acrylonitrile copolymer resin, a polyester resin, a styrene-maleic acid copolymer resin, a fluorocarbon resin or a copolymer of those mentioned above can be used. Further, the polymer compound (e) may be used in combination of two or more kinds in any proportion.

<Surfactant (f)>

When the surfactant (f) is added to the carbon nanotube-containing composition of the present invention, solubilization or dispersion of the carbon nanotube can be further accelerated and flatness, coating properties, electrical conductivity, and the like can be improved. The surfactant (f) that can be used in the present invention is not particularly limited as long as it is not the foregoing urethane compound (b). As a concrete example, an anion surfactant such as an alkyl sulfonic acid, an alkylbenzene sulfonic acid, an alkyl carboxylic acid, an alkyl naphthalene sulfonic acid, an α-olefin sulfonic acid, a dialkyl sulfosuccinic acid, an α-sulfonated aliphatic acid, N-methyl-N-oleyl taurine, a petroleum sulfonic acid, an alkyl sulfuric acid, a sulfated fat and oil, a polyoxyethylene alkylether sulfate, a polyoxyethylene styrenated phenylether sulfate, an alkyl phosphate, a polyoxyethylene alkylether phosphate, a polyoxyethylene alkylphenylether phosphate, or a condensate of naphthalene sulfonic acid with formaldehyde or its salt; a cation surfactant such as a primary to tertiary amine, a tetraalkyl ammonium salt, a trialkylbenzyl ammonium salt, an alkylpyridinium salt, 2-alkyl-1-alkyl-1-hydroxyethyl imidazolinium salt, N,N-dialkyl morpholinium salt, a polyethylene polyamine aliphatic amide or its salt, a condensate of polyethylene polyamine aliphatic amide with urea or its salt, or a quaternary ammonium salt of a condensate of polyethylene polyamine aliphatic amide with urea; an amphoteric surfactant like a betaine such as N,N-dimethyl-N-alkyl-N-carboxymethyl ammonium betaine, N,N,N-trialkyl-N-sulfoalkylene ammonium betaine, N,N-dialkyl-N,N-bispolyoxyethylene ammonium sulfate betaine, or 2-alkyl-1-carboxymethyl-1-hydroxyethyl imidazolinium betaine or an aminocarboxylic acid such as N,N-dialkylaminoalkylene carboxylate; a nonion surfactant such as a polyoxyethylene alkyl ether, a polyoxyethylene alkylphenyl ether, a polyoxyethylene polystyrylphenyl ether, a polyoxyethylene-polyoxypropylene glycol, a polyoxyethylene-polyoxypropylene alkyl ether, a polyol aliphatic acid partial ester, a polyoxyethylenepolyol aliphatic acid partial ester, a polyoxyethylene aliphatic acid ester, a polyglycerin aliphatic acid ester, a polyoxyethylated castor oil, an aliphatic acid diethanol amide, a polyoxyethylene alkylamine, a triethanolamine aliphatic acid partial ester, or a trialkylamine oxide; or a fluorocarbon surfactant such as a fluoroalkyl carboxylic acid, a perfluoroalkyl carboxylic acid, a perfluoroalkyl benzenesulfonic acid, or a perfluoroalkyl polyoxyethylene ethanol can be used. Here, the number of carbon atoms in the alkyl group is preferably 1 to 24 and more preferably 3 to 18. The surfactant may be used in combination of two or more kinds.

<Silane Coupling Agent (g)>

The silane coupling agent (g) can be used together in the present invention. Water resistance of the coating film obtained from the carbon nanotube-containing composition in which the silane coupling agent (g) is used together is remarkably improved. The silane coupling agent (g) that can be used in the present invention is not particularly limited as long as it can dissolve in at least one of the urethane compound (b), the polymerizable monomer (c-1), and the solvent (c-2) to be used in the present invention, and for example, the silane coupling agent represented by the following general formula (6) can be listed.

(In the formula (6), $R^{61}$ to $R^{63}$ respectively independently represent hydrogen atom, a straight chain or branched chain alkyl group having 1 to 6 carbon atoms, a straight chain or branched chain alkoxy group having 1 to 6 carbon atoms, amino group, acetyl group, phenyl group, or a halogen atom, $X^{61}$ represents the following formula (7), $Y^{61}$ represents one of hydroxyl group, thiol group, amino group, epoxy group, and epoxycyclohexyl group.)

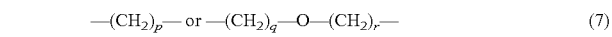

(In the formula (7), p, q, and r represent an integer of 1 to 6, respectively.)

As the silane coupling agent having an epoxy group, γ-glycidyloxypropyl trimethoxysilane, γ-glycidyloxypropyl methyldimethoxysilane, γ-glycidyloxypropyl triethoxysilane, or the like can be listed.

As the silane coupling agent having an amino group, γ-aminopropyl triethoxysilane, β-aminoethyl trimethoxysilane, γ-aminopropoxypropyl trimethoxysilane, or the like can be listed.

As the silane coupling agent having a thiol group, γ-mercaptopropyl trimethoxysilane, β-mercaptoethyl methyldimethoxysilane, or the like can be listed.

As the silane coupling agent having a hydroxyl group. β-hydroxyethoxyethyl triethoxysilane, γ-hydroxypropyl trimethoxysilane, or the like can be listed.

As the silane coupling agent having a epoxycyclohexyl group, β-(3,4-epoxycyclohexyl)ethyl trimethoxysilane, or the like can be listed.

<Colloidal Silica (h)>

The colloidal silica (h) can be further used together in the present invention. Surface hardness and weather resistance of the coating film obtained from the carbon nanotube-containing composition in which the colloidal silica (h) is used together are remarkably improved. The colloidal silica (h) that can be used in the present invention is not particularly limited, however, the one that is dispersed in water, an organic solvent, or a mixed solvent of water and an organic solvent is preferably used. As the organic solvent, though it is not limited, for example, an alcohol such as methanol, ethanol, isopropyl alcohol, propyl alcohol, butanol, or pentanol; a ketone such as acetone, methyl ethyl ketone, ethyl isobutyl ketone, or methyl isobutyl ketone; an ethylene glycol such as ethylene glycol, ethylene glycol methyl ether, or ethylene glycol mono-n-propyl ether; or a propylene glycol such as propylene glycol, propylene glycol methyl ether, propylene glycol ethyl ether, propylene glycol butyl ether, or propylene glycol propyl ether can be preferably used. Further, as the colloidal silica (h), the one having the particle diameter in the range of from 1 to 300 nm is preferable, that having the particle diameter in the range of from 1 to 150 nm is more preferable, and that having the particle diameter in the range of from 1 to 50 nm is furthermore preferable. When the colloidal silica having the particle diameter in this range is used, surface hardness and weather resistance of the resultant coating film are remarkably improved while the coating film maintains its transparency.

<Carbon Nanotube-Containing Composition>

The carbon nanotube-containing composition of the present invention contains the carbon nanotube (a) and the urethane compound (b) as essential components and may contain at least one of the polymerizable monomer (c-1) and the solvent (c-2). Further, it can contain at least one of the polymer compound (e), the surfactant (0, the silane coupling agent (g), and colloidal silica (h), when necessary.

The amount of the carbon nanotube (a) is preferably 0.0001 to 20 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)) and more preferably 0.001 to 10 parts by mass. When the amount of the carbon nanotube (a) is in this compositional range, electrical conductivity, solubility or dispersibility becomes excellent, and a further increase in the amount of the carbon nanotube (a) does not produce any more improvements on performance.

The amount of the urethane compound (b), in the case that at least one of the polymerizable monomer (c-1) and the solvent (c-2) is used together, is preferably 0.001 to 99.9 parts by mass to 100 parts by mass of at least one of the polymerizable monomer (c-1) and the solvent (c-2) and more preferably 0.01 to 99.9 parts by mass. When the amount of the urethane compound (b) is in this range, electrical conductivity, solubility or dispersibility becomes excellent, and a further increase in the amount of the urethane compound (b) does not produce any more improvements on performance.

When the polymerizable monomer (c-1) and the solvent (c-2) are used together, the ratio of the amount of the polymerizable monomer (c-1) to that of the solvent (c-2), namely the polymerizable monomer (c-1)/the solvent (c-2), is 100/0 to 0/100, and hence they can be mixed with any desired ratio.

The photopolymerization initiator (d-1) is used in the case that the urethane compound (b) is a polymerizable monomer or in the case that the polymerizable monomer (c-1) is used or in both foregoing cases, and the amount of the photopolymerization initiator (d-1) is preferably 0.05 to 10 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)). When the amount of the photopolymerization initiator (d-1) is in this range, the carbon nanotube-containing composition can be sufficiently cured, and there is no coloring in the resultant cured film, and a composite having high transparency can be obtained.

The thermal polymerization initiator (d-2) is used in the case that the urethane compound (b) is a polymerizable monomer or in the case that the polymerizable monomer (c-1) is used or in both foregoing cases, and the amount of the thermal polymerization initiator (d-2) is preferably 0.05 to 10 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)). When the amount of the thermal polymerization initiator (d-2) is in this range, the carbon nanotube-containing composition can be sufficiently cured, and there is no coloring in the resultant cured film, and a composite having high transparency can be obtained.

The amount of the polymer compound (e) is preferably 0.1 to 400 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)) and more preferably 0.5 to 300 parts by mass. When the amount of the polymer compound (e) is 0.1 part by mass or more, film-formability, moldability, and strength are improved, while when the amount of the polymer compound (e) is 400 parts by mass or less, lowering of solubility of the urethane compound (b) or the carbon nanotube (a) is small and electrical conductivity is maintained at an excellent level in particular.

The amount of the surfactant (f) is preferably 0.0001 to 10 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)) and more preferably 0.01 to 5 parts by mass. When the amount of the surfactant (f) is within this range, solubility or dispersibility of the carbon nanotube (a) and long-term storage stability are particularly excellent, and a further increase in the amount of the surfactant (f) does not produce any more improvements.

The amount of the silane coupling agent (g) is preferably 0.001 to 20 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)) and more preferably 0.01 to 15 parts by mass. When the amount of the silane coupling agent (g) is within this range, water resistance of the resultant coating film is particularly excellent, and a further increase in the amount of the silane coupling agent (g) does not produce any more improvements on performance.

The amount of the colloidal silica (h) is preferably 0.001 to 100 parts by mass to 100 parts by mass of the total of the components of the carbon nanotube-containing composition other than the carbon nanotube (a) (the urethane compound (b); the urethane compound (b) and the polymerizable monomer (c-1); the urethane compound (b) and the solvent (c-2); or the urethane compound (b), the polymerizable monomer (c-1) and the solvent (c-2)) and more preferably 0.01 to 50 parts by mass. When the amount of the colloidal silica (h) is 0.001 part by mass or more, extent of improvements of water resistance, weather resistance, and hardness become large.

Further, various publicly known materials such as a plasticizer, a dispersant, a coating surface conditioner, a flowability conditioner, an ultraviolet light absorber, an antioxidant, a storage stabilizer, an adhesion aid, and a thickening agent can be added to the carbon nanotube-containing composition of the present invention. Further, a conductive material can be contained in the carbon nanotube-containing composition of the present invention in order to further improve its electrical conductivity. As the conductive material, a carbon material such as carbon fiber, conductive carbon black, or graphite; a metal oxide such as tin oxide or zinc oxide; a metal such as silver, nickel, or copper; a 7-conjugated polymer having a repeating unit such as phenylene vinylene, vinylene, thienylene, pyrrolylene, phenylene, iminophenylene, isothianaphthene, furylene, or carbazolylene; or a trimer of symmetric or asymmetric indole derivative can be listed. Among these conductive materials, a 7-conjugated polymer and a trimer of indole derivative or its doping substance are more preferable, and a water soluble 7-conjugated polymer having at least one of sulfonic acid group and carboxyl group and a trimer of indole derivative or its doping substance are particularly preferable.

<Method for Preparing the Carbon Nanotube-Containing Composition>

When predetermined components are mixed, a stirring or kneading device such as a device of ultrasonic waves, a homogenizer, a spiral mixer, a planetary mixer, a disperser, or a hybrid mixer is used. In particular, it is preferable to mix the carbon nanotube (a) and the urethane compound (b) or to mix the carbon nanotube (a), the urethane compound (b), at least one of the polymerizable monomer (c-1) and the solvent (c-2), and further another component, and to irradiate ultrasonic waves on the resultant mixture, and at this time, it is particularly preferable to simultaneously apply irradiation of ultrasonic waves and a homogenizer (an ultrasonic wave homogenizer) to the resultant mixture. The condition to irradiate ultrasonic waves is not particularly limited, and sufficient strength and irradiating time of the ultrasonic waves for homogeneously dispersing or dissolving the carbon nanotube (a) into at least one of the urethane compound (b), the polymerizable monomer (c-1), and the solvent (c-2) may be available. For example, the rated output of an ultrasonic transmitter is preferably 0.1 to 2.0 watt/cm$^2$ per unit bottom surface area of the ultrasonic transmitter and more preferably 0.3 to 1.5 watt/cm$^2$, and the oscillation frequency is preferably in the range of from 10 to 200 KHz and more preferably in the range of from 20 to 100 KHz. The irradiating time of the ultrasonic waves is preferably from 1 minute to 48 hours and more preferably from 5 minutes to 48 hours. Subsequently, a ball type kneader such as a ball mill, a vibration mill, a sand mill, or a roll mill may be used to further thoroughly disperse or dissolve the carbon nanotube (a).

When the predetermined components are mixed, all the components may also be added in a lump or, for example, it is also available to prepare a concentrated carbon nanotube-containing composition at first by using a material in which the urethane compound (b) is dissolved in a small amount of the polymerizable monomer (c-1) or the solvent (c-2) to be used, and then to dilute the concentrated carbon nanotube-containing composition to a predetermined concentration. Further, in the case that two or more kinds of the polymerizable monomer (c-1) or the solvent (c-2) are used in the form of mixture, it is also available to prepare a concentrated carbon nanotube-containing composition at first by using a material in which the urethane compound (b) is dissolved in at least one component of the polymerizable monomer (c-1) or the solvent (c-2), and then to dilute the concentrated carbon nanotube-containing composition with the other component of the polymerizable monomer (c-1) or the solvent (c-2).

The temperature of the carbon nanotube-containing composition when irradiation of the ultrasonic waves is carried out is preferably 60° C. or below and more preferably 40° C. or below in respect of improving dispersibility. In particular, in the case that the urethane compound (b) is a polymerizable monomer or in the case that the polymerizable monomer (c-1) is used or in both foregoing cases to prepare the carbon nanotube-containing composition, the temperature is more preferably 40° C. or below from the viewpoint of inhibiting polymerization.

<Composite>

The composite of the present invention is the one which has the coating film or the cured film of the carbon nanotube-containing composition of the present invention on a surface of a base material.

As the base material, a film, a sheet, a foaming body, a multi porous membrane, an elastomer, or a molded article of a synthetic resin; wood, paper, ceramics, fiber, nonwoven fabric, carbon fiber, carbon fiber paper, a glass plate, or a stainless steel plate can be listed.

As the synthetic resin, polyethylene, polyvinyl chloride, polypropylene, polystyrene, an acrylonitrile-butadiene-styrene resin (ABS resin), an acrylonitrile-styrene resin (AS resin), an acrylic resin, a methacrylic resin, polybutadiene, polycarbonate, polyarylate, polyvinylidene fluoride, polyester, polyamide, polyimide, polyaramide, polyphenylene sulfide, polyetheretherketone, polyphenylene ether, polyethernitrile, polyamideimide, polyether sulfone, polysulfone, polyetherimide, polybutylene terephthalate, or polyurethane can be listed. The synthetic resin may be used alone or as a mixture of two or more kinds.

The thickness of the cured film of the carbon nanotube-containing composition prepared using at least one of the urethane compound (b) and the polymerizable monomer (c-1) is preferably 0.5 µm or more and more preferably 1 µm or more to realize sufficient electrical conductivity. Further, the thickness of the cured film is preferably 100 µm or less and more preferably 50 µm or less to realize sufficient transparency and to suppress disadvantages such as occurrence of a crack on the cured film and a breakage of the cured film at the time of cutting a laminated body.

The thickness of the coating film of the carbon nanotube-containing composition prepared using the solvent (c-2) is preferably in the range of from 0.01 to 100 µm and more preferably in the range of from 0.1 to 50 µm. When the thickness is in this range, the coating film can maintain transparency and have sufficient electrical conductivity.

The composite of the present invention may have an antireflection film on the coating film or on the cured film, when necessary. Further, it is also available to form a cured film of a curable resin composition of the present invention on one surface of the base material and to form another functional thin film such as an antireflection film, a diffusion layer, or a bonding layer on the other surface of the base material.

The composite of the present invention is excellent in transparency because the carbon nanotube (a) is highly dispersed or dissolved in the coating film or the cured film. Therefore, the total light transmittance of the laminated body of the present invention becomes 50% or more and preferably 70% or more, and the laminated body can be applied to various uses such as a transparent conductive film, a transparent conductive sheet, and a transparent conductive molded article.

<Method for Producing a Composite>

When the coating film or the cured film of the carbon nanotube-containing composition of the present invention is formed on the surface of the base material, a method that is used in a common coating process can be used. For example, a coating method that utilizes such as a gravure coater, a roll coater, a curtain flow coater, a spin coater, a bar coater, a reverse coater, a kiss coater, a fountain coater, a rod coater, an air doctor coater, a knife coater, a blade coater, a cast coater, or a screen coater; a spraying method that utilizes such as an air spray or an airless spray; or a soaking method that utilizes such as dipping can be used.

After the carbon nanotube-containing composition prepared using the solvent (c-2) is coated on the surface of the base material, the resultant coated film may be left still at an ordinary temperature, however, it can also be subjected to heat treatment. This is preferable because the residual amount of the solvent (c-2) can be more reduced and the electrical conductivity is more improved. The temperature of the heat treatment is preferably in the range of from 20 to 250° C. and particularly preferably in the range of from 40 to 200° C. When the temperature of the heat treatment is 250° C. or above, it is apprehended that the urethane compound (b) itself is decomposed and there is a case that transparency or appearance is deteriorated.

As a method for producing a composite from the carbon nanotube-containing composition prepared using at least one of the urethane compound (b) and the polymerizable monomer (c-1), (i) a method for coating the carbon nanotube-containing composition on a base material followed by curing the composition; (ii) a method for coating the carbon nanotube-containing composition on an inside surface of a mold followed by curing the composition to form a cured film, pouring one of a polymerizable raw material and a molten resin into the mold followed by solidifying it to make a base material, and stripping the cured film together with the base material; or (iii) a method for pouring the carbon nanotube-containing composition into a gap between a mold and a base material followed by curing the composition to form a cured film and then stripping the cured film together with the base material can be listed.

Among these methods, the method (ii) is preferable because there is no deterioration of appearance caused by dust and the like and the cured film with an excellent surface condition can be obtained.

As the mold to be used in the method (ii), a cast for cast polymerization or a mold for molding can be listed. When the cast is constituted of two plates with flat surfaces, a plate type laminated body with a flat surface can be obtained. In this case, a cured film may be formed on one cast plate or on both cast plates.

As a method for forming the base material, a method in which a polymerizable raw material is poured into a cast for cast polymerization, what is called cast polymerization method, is preferable.

As the cast polymerization method, for example, a method for coating the carbon nanotube-containing composition prepared using the polymerizable monomer (c-1) and a photopolymerization initiator (d-1) on an inside surface of a glass mold constituted of a glass plate for cast polymerization followed by photocuring the composition and then pouring the polymerizable raw material into the glass mold to polymerize the raw material can be listed. The glass mold can be set up, for example, by sandwiching a gasket made of soft polyvinylchloride, ethylene-vinyl acetate copolymer, polyethylene, ethylene-methyl methacrylate copolymer, or the like between two glass plates and fixing them by clamps and the like.

As a continuous cast polymerization method, for example, a method for polymerizing methyl methacrylate between two steel belts using the apparatus disclosed in Japanese Patent Publication No. Sho 46-41,602 can be listed. In this continuous cast polymerization method, the carbon nanotube-containing composition prepared using the polymerizable monomer (c-1) and a photopolymerization initiator (d-1) or the polymerizable monomer (c-1) and a thermal polymerization initiator (d-2) is coated on the surfaces of the steel belts and cured to form cured films. Further, when a design such as convexoconcave is previously provided on the surfaces of the steel belts, the composite with the design on its surfaces can be produced. Further, it is also available to paste films which have convexoconcave on their surfaces and which do not dissolve or swell with the carbon nanotube-containing composition on the steel belts and to coat the carbon nanotube-containing composition prepared using the polymerizable monomer (c-1) and a photopolymerization initiator (d-1) or the polymerizable monomer (c-1) and a thermal polymerization initiator (d-2) on the convexoconcave surfaces and to cure them.

As the polymerizable raw material, a monomer mixture in which the main component is (meth)acrylic acid or (meth)acrylate, or a mixture of a polymer in which a part of the monomer mixture is polymerized and the monomer mixture is preferable from the viewpoint of transparency of a laminated body having a cured film of a curable resin composition.

As the (meth)acrylate, methyl (meth)acrylate, ethyl (meth)acrylate, propyl (meth)acrylate, butyl (meth)acrylate, n-hexyl (meth)acrylate, cyclohexyl (meth)acrylate, 2-ethylhexyl (meth)acrylate, phenyl (meth)acrylate, benzyl (meth)acrylate, dimethylaminoethyl (meth)acrylate, diethylaminoethyl (meth)acrylate, (meth)acrylic acid ethyltrimethyl ammonium chloride, or the like can be listed.

The monomer mixture may contain another polymerizable monomer such as styrene, methyl styrene, bromostyrene, vinyl toluene, divinylbenzene, vinyl acetate, N-vinyl caprolactam, or N-vinyl pyrrolidone. The other polymerizable monomer may be used alone or in combination of two or more kinds.

In the mixture of a polymer in which a part of the monomer mixture is polymerized and the monomer mixture, a rate of polymerization of the monomer mixture is preferably 35% by mass or less.

A chain transfer agent may be added to the polymerizable raw material. As the chain transfer agent, a mercaptan based chain transfer agent such as an alkyl mercaptan having 2 to 20 carbon atoms, mercapto acid, thiophenol, or a mixture of them is preferable, and a mercaptan having a short alkyl chain such as n-octyl mercaptan or n-dodecyl mercaptan is particularly preferable.

When the polymerizable raw material is polymerized by heat, a radical polymerization initiator such as an azo compound, an organic peroxide, or a redox polymerization initiator may be added. As the azo compound, 2,2'-azobis(isobutyronitrile), 2,2'-azobis(2,4-dimethylvaleronitrile), 2,2'-azobis(2,4-dimethyl-4-methoxyvaleronitrile), or the like can be listed. As the organic peroxide, benzoyl peroxide, lauroyl peroxide, or the like can be listed. As the redox polymerization initiator, a combination of an organic peroxide and an amine, or the like can be listed.

When the polymerizable raw material is polymerized by ultraviolet light irradiation, a photopolymerization initiator such as a phenyl ketone compound or a benzophenone compound may be added. As a photopolymerization initiator on the market, "Irgacure 184" (manufactured by Ciba-Geigy Japan Limited), "Irgacure 907" (manufactured by Ciba-Geigy Japan Limited), "Dalocure 1173" (manufactured by Merck Ltd., Japan), "Ezacure KIP100F" (manufactured by Nihon SiberHegner K.K.), or the like can be listed.

Further, when the polymerizable raw material is polymerized by ultraviolet light irradiation, a photo-sensitizer may be added. As the photosensitizer, benzoin, benzoin ethyl ether, 2-hydroxy-2-methyl-phenylpropane-1-on, 1-hydroxy cyclohexyl phenylketone, azobisisobutyronitrile, benzoyl peroxide, or the like can be listed. Further, a photosensitizer having a photosensitizing action at a wavelength of 400 nm or less may be added.

As a method for coating the carbon nanotube-containing composition of the present invention, a method for using a gravure coater, a roll coater, a curtain flow coater, a spin coater, a bar coater, a reverse coater, a kiss coater, a fountain coater, a rod coater, an air doctor coater, a knife coater, an air knife coater, a blade coater, a cast coater, a screen coater, or the like; a spraying method such as an air spray or an airless spray; or a soaking method such as dipping can be listed.

The carbon nanotube-containing composition explained so far can disperse or dissolve the carbon nanotube (a) in at least one of the urethane compound (b), the polymerizable monomer (c-1), and the solvent (c-2) without deteriorating the characteristic properties of the carbon nanotube (a) itself, and does not separate or agglomerate in the case of a long-term storage. The reason of this phenomenon is not clearly understood, however, it is presumed that the urethane compound (b) used in the present invention be adsorbed to the carbon nanotube (a) or wrap the carbon nanotube (a) in a spiral manner so that the carbon nanotube (a) be dispersed or be dissolved in at least one of the polymerizable monomer (c-1) and the solvent (c-2) together with the urethane compound (b).

Further, with respect to the laminated body of the present invention, there is no peel-off of the carbon nanotube (a) caused by an external stimulus, and excellent electrical conductivity and transparency can be maintained for a long time because the cured film is formed while the state that the carbon nanotube (a) is dispersed or dissolved to a high degree is maintained.

EXAMPLES

Hereinafter, the present invention is explained in more detail by examples, however, the following examples do not limit the range and scope of the present invention. As the carbon nanotube of the raw material, a multi-walled carbon nanotube or a single-walled carbon nanotube was used (hereinafter, sometimes abbreviated to MWNT and SWNT, respectively).

Production Example 1

Urethane Compound 1

Three moles of 2-hydroxytrimethylene dimethacrylate were reacted with 1 mole of triisocyanate composed of a trimer of hexamethylene diisocyanate to obtain urethane compound 1.

Production Example 2

Urethane Compound 2

Two moles of 2-hydroxytrimethylene dimethacrylate were reacted with 1 mole of hexamethylene diisocyanate to obtain urethane compound 2.

Production Example 3

Urethane Compound 3

Two moles of decaethylene glycol methacrylate were reacted with 1 mole of toluene-2,4-diisocyanate to obtain urethane compound 3.

Preparation Example 1

Polymerizable monomer (1) was prepared by mixing 85 parts by mass of 1,6-hexanediol diacrylate (manufactured by Osaka Organic Chemical Industry Ltd.), 6 parts by mass of pentaerythritol tetraacrylate, and 9 parts by mass of pentaerythritol triacrylate.

Comparative Production Example 1

Urethane Compound 4

Two moles of 2-acryloyloxyethyl isocyanate were reacted with 1 mole of polycaprolactone diol to obtain urethane compound 4.

Comparative Production Example 2

Comparative Dispersant: (meth)acrylic Polymer

Sodium 2-sulfoethyl methacrylate-potassium methacrylate-methyl Methacrylate Copolymer 1:

To a separable flask equipped with a condenser having an inside volume of 2,000 ml, 20 g of sodium 2-sulfoethyl methacrylate, 10 g of potassium methacrylate, 170 g of methyl methacrylate, 350 g of tetrahydrofuran, 350 g of methanol, and 100 g of deionized water were introduced and stirred under nitrogen atmosphere. To this mixture, 1.5 g of 2,2'-azobis(2,4-dimethylvarelonitrile) was added as a polymerization initiator and the resultant mixture was heated to 60° C. After the mixture was stirred for 6 hours, a transparent polymer solution was obtained. During the polymerization, the polymerization solution was kept homogeneously and deposition or precipitation of a polymer or cloudiness of the polymerization solution was not observed. After the mixture was cooled at a room temperature, the mixture was subjected to reprecipitation treatment with isopropanol to recover white powder, and the resultant white powder was dried with a vacuum dryer at 40° C. to obtain (meth)acrylic polymer (1).

Comparative Production Example 3

Comparative Additive: Amine Compound

Dimethylaminopropyl methacrylamide-polyethylene Glycol (23) Monomethacrylate Monomethyl Ether Copolymer:

To a glass flask equipped with a stirring blade, 188 g of dimethylaminopropyl methacrylamide and 228 g of methanol were introduced, and a mixture of 136 g of dimethyl sulfate and 41.3 g of methanol was dropped while the resultant mixture was stirred in such a way that the temperature of the resultant mixture became 15° C. or below, and stirring was continued for 30 minutes after the dropping was finished to obtain 593.3 g of a solution containing 318 g of dimethylaminopropyl methacrylamide quaternized with dimethyl sulfate.

To this solution, 2.48 g of 2,2'-azobis(2,4-dimethylvarelonitrile), 2.48 g of n-octyl mercaptan, 406 g of methanol, 485 g of polyethylene glycol (23) monomethacrylate monomethyl ether (number in the parentheses represents number of polyethylene glycol units), and 16.5 g of 4-methacryloxy-2,2,6,6-tetramethyl piperidine were added, and polymerization was carried out for 6 hours at 60° C. under nitrogen atmosphere, and the resultant substance was vacuum-dried for 3 days at 50° C. to obtain an amine compound.

Example 1

Carbon Nanotube-Containing Composition 1

To 100 parts by mass of the polymerizable monomer (1) of Preparation Example 1 described above, 45 parts by mass of the urethane compound 1 of Production Example 1 described above and 0.1 part by mass of a multi-walled carbon nanotube were mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin ethyl ether were added to the resultant mixture as a photopolymerization initiator to obtain carbon nanotube-containing composition 1.

Example 2

Carbon Nanotube-Containing Composition 2

The same procedure as in Example 1 was carried out except that the amount of the multi-walled carbon nanotube was changed to 0.05 part by mass to obtain carbon nanotube-containing composition 2.

Example 3

Carbon Nanotube-Containing Composition 3

The same procedure as in Example 1 was carried out except that the multi-walled carbon nanotube was changed to 0.1 part by mass of a single-walled carbon nanotube to obtain carbon nanotube-containing composition 3.

Example 4

Carbon Nanotube-Containing Composition 4

The same procedure as in Example 1 was carried out except that 10 parts by mass of methanol were further added as a solvent to obtain carbon nanotube-containing composition 4.

Example 5

Carbon Nanotube-Containing Composition 5

To 100 parts by mass of the polymerizable monomer (1) of Preparation Example 1 described above, 45 parts by mass of the urethane compound 2 of Production Example 2 described above and 0.1 part by mass of the multi-walled carbon nanotube were mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin ethyl ether were added to the resultant mixture as a photopolymerization initiator to obtain carbon nanotube-containing composition 5.

Example 6

Carbon Nanotube-Containing Composition 6

The same procedure as in Example 5 was carried out except that the multi-walled carbon nanotube was changed to 0.1 part by mass of the single-walled carbon nanotube to obtain carbon nanotube-containing composition 6.

Example 7

Carbon Nanotube-Containing Composition 7

To 100 parts by mass of the polymerizable monomer (1) of Preparation Example 1 described above, 45 parts by mass of the urethane compound 3 of Production Example 3 described above and 0.1 part by mass of the multi-walled carbon nanotube were mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin ethyl ether were added to the resultant mixture as a photopolymerization initiator to obtain carbon nanotube-containing composition 7.

Example 8

Carbon nanotube-containing composition 8

To 100 parts by mass of the polymerizable monomer (1) of Preparation Example 1 described above, 5 parts by mass of the urethane compound 2 of Production Example 2 described above and 0.1 part by mass of the multi-walled carbon nanotube were mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin ethyl ether were added to the resultant mixture as a photopolymerization initiator to obtain carbon nanotube-containing composition 8.

Each composition of the carbon nanotube-containing composition of Examples 1 to 7 is shown in the following Table 1.

TABLE 1

|  | Carbon nanotube | Urethane compound | Polymerizable monomer Solvent | Polymerization initiator |
|---|---|---|---|---|
| Example 1 | MW/NT 0.1 part by mass | Urethane compound 1 45 parts by mass | Polymerizable monomer (1) 100 parts by mass | BEE 1.5 parts by mass |
| Example 2 | MWNT 0.05 part by mass | Urethane compound 1 45 parts by mass | Polymerizable monomer (1) 100 parts by mass | BEE 1.5 parts by mass |
| Example 3 | SWNT 0.1 part by mass | Urethane compound 1 45 parts by mass | Polymerizable monomer (1) 100 parts by mass | BEE 1.5 parts by mass |
| Example 4 | MWNT 0.05 part by mass | Urethane compound 1 45 parts by mass | Polymerizable monomer (1) 100 parts by mass Methanol 10 parts by mass | BEE 1.5 parts by mass |
| Example 5 | MWNT 0.1 part by mass | Urethane compound 2 45 parts by mass | Polymerizable monomer (1) 100 parts by mass | BEE 1.5 parts by mass |

TABLE 1-continued

| | Carbon nanotube | Urethane compound | Polymerizable monomer Solvent | Polymerization initiator |
|---|---|---|---|---|
| Example 6 | SWNT 0.1 part by mass | Urethane compound 2 45 parts by mass | Polymerizable monomer (1) 100 parts by mass | BEE 1.5 parts by mass |
| Example 7 | MWNT 0.1 part by mass | Urethane compound 3 45 parts by mass | Polymerizable monomer (1) 100 parts by mass | BEE 1.5 parts by mass |
| Example 8 | MWNT 0.1 part by mass | Urethane compound 2 5 parts by mass | Polymerizable monomer (1) 100 parts by mass | BEE 1.5 parts by mass |

Comparative Example 1

Carbon Nanotube-Containing Composition 9

To 100 parts by mass of the polymerizable monomer (1) of Preparation Example 1 described above, 0.1 part by mass of the multi-walled carbon nanotube was mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin ethyl ether were added to the resultant mixture as a photopolymerization initiator to obtain carbon nanotube-containing composition 9.

Comparative Example 2

Carbon Nanotube-Containing Composition 10

The same procedure as in Comparative Example 1 was carried out except that the multi-walled carbon nanotube was changed to 0.1 part by mass of the single-walled carbon nanotube to obtain carbon nanotube-containing composition 10.

Comparative Example 3

Carbon Nanotube-Containing Composition 11

To 100 parts by mass of the polymerizable monomer (1) of Preparation Example 1 described above, 45 parts by mass of the urethane compound 4 of Comparative Production Example 4 and 0.1 part by mass of the multi-walled carbon nanotube were mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin ethyl ether were added to the resultant mixture as a photopolymerization initiator to obtain carbon nanotube-containing composition 11.

Comparative Example 4

Carbon Nanotube-Containing Composition 12

To 100 parts by mass of water, 10 parts by mass of ethyl carbamate (manufactured by Wako Pure Chemical Industries, Ltd.) as an urethane compound was dissolved, and 0.05 part by mass of the multi-walled carbon nanotube was mixed at a room temperature, and the resultant mixture was subjected to ultrasonic wave homogenizer treatment (20 kHz, vibra cell, manufactured by SONIC Corp) for 1 hour under ice-cold condition to obtain carbon nanotube-containing composition 12.

Comparative Example 5

Carbon Nanotube-Containing Composition 13

To 100 parts by mass of toluene, 10 parts by mass of N-methyl-N-phenyl urethane (manufactured by Sigma-Aldrich Corporation) as an urethane compound was dissolved, and 0.05 parts by mass of the multi-walled carbon nanotube was mixed at a room temperature, and the resultant mixture was subjected to ultrasonic wave homogenizer treatment (20 kHz, vibra cell, manufactured by SONIC Corp) for 1 hour under ice-cold condition to obtain carbon nanotube-containing composition 13.

Comparative Example 6

Carbon Nanotube-Containing Composition 14

To 100 parts by mass of the polymerizable monomer (1) of Preparation Example 2 described above, 5 parts by mass of the (meth)acrylic polymer (1) of Comparative Production Example 2 described above and 0.05 parts by mass of the multi-walled carbon nanotube were added and mixed at a room temperature, and the resultant mixture was subjected to ultrasonic wave homogenizer treatment (20 kHz, vibra cell, manufactured by SONIC Corp) for 1 hour under ice-cold condition, and then 1.5 parts by mass of benzoin isopropyl ether (trade name: SEIKUOL BIP, manufactured by Seiko Chemical Co., Ltd., hereinafter expressed also as BIP) were added to the resultant mixture as a photopolymerization initiator to obtain carbon nanotube-containing composition 14.

Comparative Example 7

Carbon Nanotube-Containing Composition 15

The same procedure as in Comparative Example 6 was carried out except that 16 parts by mass of the amine compound of Comparative Production Example 2 were further added to Comparative Example 6 to obtain carbon nanotube-containing composition 15.

Each composition of the carbon nanotube-containing compositions of Comparative Examples 1 to 7 is shown in the following Table 2.

TABLE 2

|  | Carbon nanotube | Dispersant | Solvent/Polymerizable monomer | Amine compound | Polymerization initiator |
|---|---|---|---|---|---|
| Comp. Ex. 1 | MWNT 0.1 part by mass | — | Polymerizable monomer (1) 100 parts by mass | — | BEE 1.5 parts by mass |
| Comp. Ex. 2 | SWNT 0.1 part by mass | — | Polymerizable monomer (1) 100 parts by mass | — | BEE 1.5 parts by mass |
| Comp. Ex. 3 | MWNT 0.1 part by mass | Urethane compound (4) 45 parts by mass | Polymerizable monomer (1) 100 parts by mass | — | BEE 1.5 parts by mass |
| Comp. Ex. 4 | MWNT 0.05 part by mass | Ethyl carbamate 10 parts by mass | Water 100 parts by mass | — | — |
| Comp. Ex. 5 | MWNT 0.05 part by mass | N-methyl-N-phenyl urethane 10 parts by mass | Toluene 100 parts by mass | — | — |
| Comp. Ex. 6 | MWNT 0.05 part by mass | (Meth)acrylic polymer (1) 5 parts by mass | Polymerizable monomer (1) 100 parts by mass | — | BIP 1.5 parts by mass |
| Comp. Ex. 7 | MWNT 0.05 part by mass | (Meth)acrylic polymer (1) 5 parts by mass | Polymerizable monomer (1) 100 parts by mass | Amine compound 16 parts by mass | BIP 1.5 parts by mass |

(Evaluation 1 of Composite)

Evaluation was carried out with respect to the carbon nanotube-containing composition of all the examples and comparative examples except Comparative Examples 4 and 5.

The above composition was dropped on an acrylic resin plate (a thickness of 3 mm), on which a PET film with the thickness of 50 μm (manufactured by Teijin Limited) was placed and stroked with a rubber roll having JIS hardness of 30° to adjust the thickness of the composition to 15 μm. Subsequently, the resultant material was passed through under an ultraviolet fluorescent lamp with the power of 40 W (FL40BL, manufactured by Toshiba Corporation), at a position 10 cm below the lamp, with the PET film side facing upward, at a speed of 0.8 m/min, to pre-cure the composition, and then the PET film was peeled off. Subsequently, the resultant material was passed through under a high pressure mercury vapor lamp with the power of 30 W/cm, at a position 20 cm below the lamp, with the coating film side facing upward, at a speed of 0.8 m/min, to cure the composition and to obtain a composite having a cured film on its surface. With the obtained composite, appearance was observed, and total light transmittance and surface resistance were measured.

(Evaluation 2 of Composite)

Evaluation was carried out with respect to Example 1 (the carbon nanotube-containing composition 1).

The above composition was dropped on a mirror surface side of a stainless steel plate having a mirror surface, on which a biaxially oriented film made of polyethylene terephthalate (hereinafter expressed also as PET) with the thickness of 50 μm (manufactured by Teijin Limited) was placed and stroked with a rubber roll having JIS hardness of 30° to adjust the thickness of the composition to 30 μm. Subsequently, the resultant material was passed through under an ultraviolet fluorescent lamp having the power of 40 W (FL40BL, manufactured by Toshiba Corporation), at a position 10 cm below the lamp, with the PET film side facing upward, at a speed of 0.8 m/min, to pre-cure the composition, and then the PET film was peeled off. Subsequently, the resultant material was passed through under a high pressure mercury vapor lamp having the power of 30 W/cm, at a position 20 cm below the lamp, with the coating film side facing upward, at a speed of 0.8 m/min, to cure the composition and to form a cured film. Two stainless steel plates on each of which the cured film has been formed were placed face to face each other with their cured films inside, both open sides of which were sealed with gaskets made of soft polyvinyl chloride, to make a template for cast polymerization. To the resultant template for cast polymerization, a polymerizable raw material composed of 100 parts by mass of a partial polymer having a rate of polymerization of 20% by mass of methyl methacrylate and 0.05 part by mass of 2,2'-azobis(2,4-dimethylvarelonitrile) was poured, and the gap between the two stainless steel plates placed face to face each other was adjusted to 2 mm, and polymerization was carried out for 1 hour in a water bath at 80° C., and then for 1 hour in an air furnace at 130° C. The resultant resin plate was peeled off from the stainless steel plates after cooled, and a composite with a cured film on its surface was obtained. With the obtained composite, appearance was observed, and total light transmittance and surface resistance were measured.

(Evaluation 2 of Composite)

Evaluation was carried out with respect to Comparative Examples 4 and 5.

The above composition was coated on a glass plate with bar coater method (bar coater No. 3 being used), and dried for 5 minutes at 80° C. to obtain a composite. With the obtained composite, appearance was observed, and total light transmittance and surface resistance were measured.

<Evaluation Method>

(Visual Inspection of a Solution State)

The solution state of each carbon nanotube-containing composition obtained in the examples and comparative examples was visually inspected at the time right after the carbon nanotube was dispersed and at the time after the carbon nanotube-containing composition was left still for one day.

A: Visually inspected as a homogeneous composition in the solution state

B: Visually inspected as an inhomogeneous composition in the solution state (Evaluation of Dispersibility in the Solution State by Near Infrared Spectroscopy)

It is known that a characteristic near infrared spectrum is observed with regard to a single-walled carbon nanotube when it is dispersed. Consequently, near infrared spectroscopy measurement was carried out on the carbon nanotube-containing compositions 3, 6, and 9 which were produced by dispersing a single-walled carbon nanotube.

The near infrared spectroscopy measurement was carried out with UV-3100 (manufactured by Shimadzu Corporation)

using a cell having an optical path length of 1 mm on the sample prepared by diluting the carbon nanotube-containing composition 10 times.

In the case of the carbon nanotube-containing composition 3 in which the urethane compound 1 was used (Example 3) and the carbon nanotube-containing composition 6 in which the urethane compound 2 was used (Example 6), the characteristic absorptions of the single-walled carbon nanotube were observed in the near infrared region (1,300 $cm^{-1}$, 800 $cm^{-1}$) because the single-walled carbon nanotubes were dispersed to the each single tube level owing to the dispersive action of the urethane compound. However, in the case of the carbon nanotube-containing composition 9 which does not contain the urethane compound (Comparative Example 1), the characteristic absorptions of the single-walled carbon nanotube were not observed because the single-walled carbon nanotube cannot be dispersed.

(Surface resistance): Surface resistance was measured under the conditions of 25° C. and 50% RH. In the case that the surface resistance is $10^8 \Omega$ or more, two-point probe method was used (inter-electrode distance: 20 mm), while in the case that the surface resistance is $10^7 \Omega$ or less, four-point probe method was used (respective distance between electrodes: 5 mm).

(Total light transmittance): Total light transmittance (%) was measured with HAZEMETER NDH2000 manufactured by Nippon Denshoku Industries Co., Ltd.

(Observation of appearance of a composite): Film-formability, uniformity of the surface, and the color tone of the composite obtained by coating were visually inspected.

(Film-Formability)

A: A uniform coating film was easily formed.

B: A coating film was not formed, though coating was attempted.

(Uniformity):

A: An uniform composite, on the surface of which an agglomerate is not observed.

B: A nonuniform composite, on the surface of which the carbon nanotube is agglomerated.

(Mar resistance, Δ haze): A circular pad with a diameter of 1 inch equipped with steel wool of #000 was placed on the surface of a sample, and the sample was reciprocated 100 times while 1,000 g load was put on the pad, and the resultant marred part of the sample surface was washed with ethanol to measure a haze value. The difference between the haze value after the sample was marred and that before the sample was marred was shown as Δ haze (%).

In the following Table 3, the results of the evaluations of the carbon nanotube-containing compositions and the composites of Examples 1 to 7 and Comparative Examples 1 to 7 are shown.

TABLE 3

| | Solution state | | Surface resistance ($\Omega/\square$) | Total light transmittance (%) | Appearance of laminated body | | | Mar resistance Δ haze % | Note |
|---|---|---|---|---|---|---|---|---|---|
| | Solution state | After 1 day | | | Film formability | Uniformity | Color tone | | |
| Ex. 1 - Composite 1 | A | A | $4.2 \times 10^8$ | 81 | A | A | Colorless | 0.65 | |
| Ex. 1 - Composite 2 | A | A | $5.0 \times 10^8$ | 82 | A | A | Colorless | 0.01 | |
| Ex. 2 | A | A | $1.6 \times 10^9$ | 86 | A | A | Colorless | 0.72 | |
| Ex. 3 | A | A | $6.3 \times 10^6$ | 80 | A | A | Colorless | 0.58 | |
| Ex. 4 | A | A | $6.8 \times 10^{10}$ | 82 | A | A | Colorless | 0.71 | |
| Ex. 5 | A | A | $3.0 \times 10^{11}$ | 81 | A | A | Colorless | 0.47 | |
| Ex. 6 | A | A | $2.5 \times 10^7$ | 80 | A | A | Colorless | 0.76 | |
| Ex. 7 | A | A | $2.4 \times 10^7$ | 85 | A | A | Colorless | 0.43 | |
| Ex. 8 | A | A | $3.0 \times 10^{11}$ | 79 | A | A | Colorless | 0.43 | |
| Comp. Ex. 1 | B | B | $>1.0 \times 10^{14}$ | *1 | A | B | — | — | *2 |
| Comp. Ex. 2 | B | B | $>1.0 \times 10^{14}$ | *1 | A | B | — | — | *2 |
| Comp. Ex. 3 | B | B | $>1.0 \times 10^{14}$ | *1 | A | B | — | — | *2 |
| Comp. Ex. 4 | B | B | $>1.0 \times 10^{14}$ | *1 | B | B | — | — | *2 |
| Comp. Ex. 5 | B | B | $>1.0 \times 10^{14}$ | *1 | B | B | — | — | *2 |
| Comp. Ex. 6 | A | A | $5.7 \times 10^9$ | 86 | A | A | Colorless | 2.68 | |
| Comp. Ex. 7 | A | A | $8.2 \times 10^{10}$ | 83 | A | A | Colorless | 3.17 | |

*1: Total light transmittance was not measured because CNT was not dispersed and a part of agglomerated CNT was removed when a film was formed by stroking with a rubber roll.
*2: A coating film with a part of agglomerated CNT being removed when a film was formed by stroking with a rubber roll was obtained.

(Evaluation of Dispersibility of a Coating Film by a Laser Microscope Observation)

As an evaluation of CNT dispersibility, observation using Confocal Laser Scanning Microscope was carried out on the composite made from the carbon nanotube-containing composition 1 (Example 1) and on the composite made from the carbon nanotube-containing composition 9 (Comparative Example 1). The microscopic images were obtained with 0.1 μm pitch from the outermost layer of the coating film to the interface with the base material with Confocal Laser Scanning Microscope (LSM5 PASCAL, manufactured by Carl Zeiss, Inc.) using argon laser of 458 nm. The CNT dispersibility in each composite was compared by composing the microscopic image of each layer obtained and by making an extended focus image. The results are shown in FIGS. 2 and 3.

Figure 2:
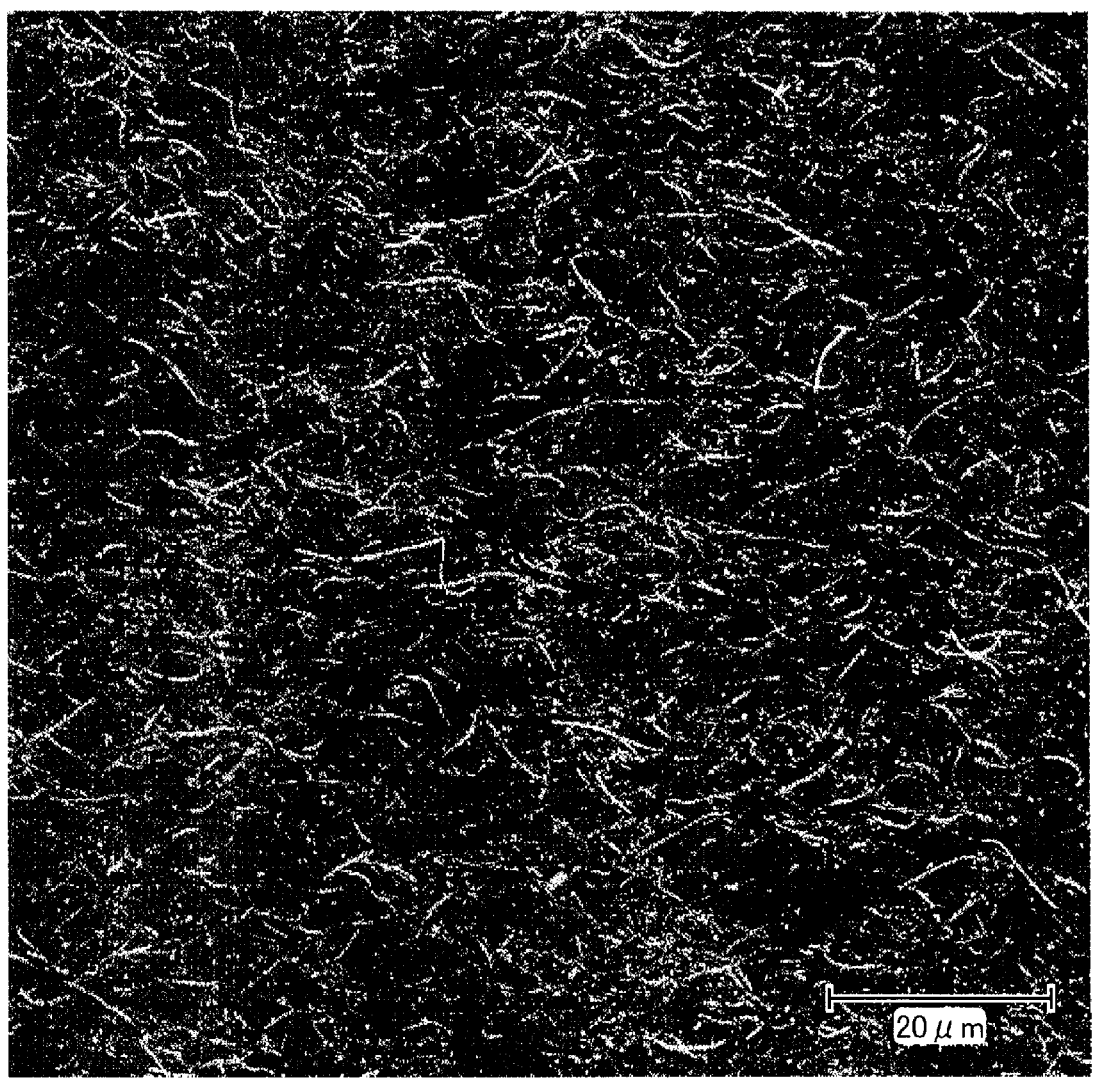
FIG. 2: A microscope image of a composite made from carbon nanotube-containing composition 1 (Example 1) with a confocal laser microscope.

In FIG. 2, dispersed CNT was observed and CNT was spreading all over the coating film.

Figure 3:
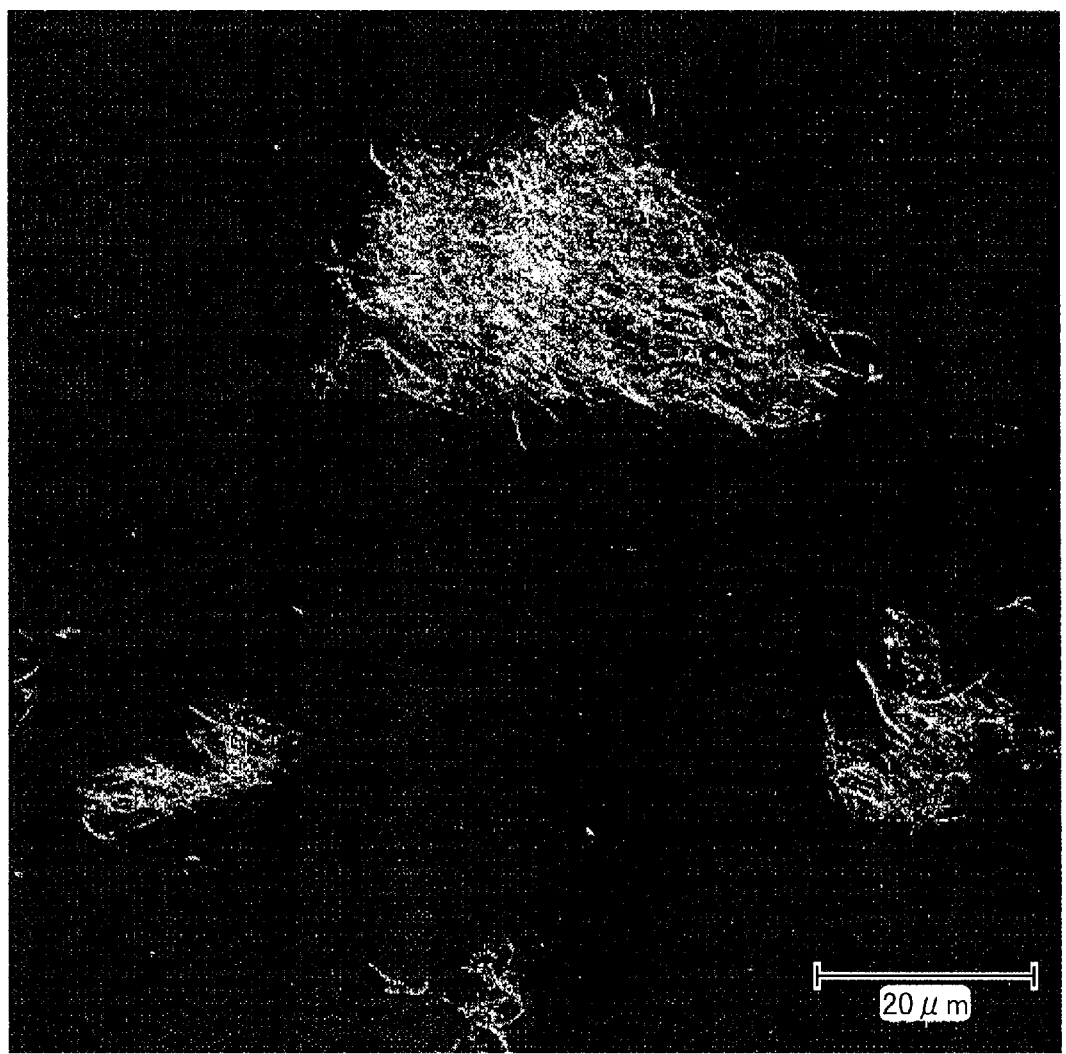
FIG. 3: A microscope image of a composite made from carbon nanotube-containing composition 9 (Comparative Example 1) with a confocal laser microscope.

In FIG. 3, a part of a lump of undispersed CNT was observed and dispersion of CNT was insufficient. From the observation results of FIGS. 2 and 3, it was found that CNT is excellently dispersed in the composite obtained by the present invention owing to the effect of the urethane compound, and thereby the composite with the compatibility of electrical conductivity and transparency can be obtained.

INDUSTRIAL APPLICABILITY

The carbon nanotube-containing composition of the present invention can be applied to the uses such as antistatic agents, condensers, electric double layer capacitors, batteries, fuel cells and their parts such as polymer electrolyte membranes, electrode layers, catalyst layers, gas diffusion layers, gas diffusion electrode layers, and separators, EMI shields, chemical sensors, display devices, nonlinear materials, anticorrosives, adhesives, fibers, fiber spinning materials, antistatic paints, anticorrosive paints, electrodeposition paints, metal plating primers, conductive primers for electrostatic deposition, electric anticorrosions, and improvement of storage ability of batteries. Further, the composite of the present invention can be used as industrial wrapping materials for semiconductor and electrical and electronic parts, transparent conductive resin plates to be used in clean rooms and the like of semiconductor production, antistatic films for electro-photographic image recording materials such as overhead projector films and slide films, transparent conductive films, antistatic materials for magnetic recording tapes such as audio tapes, video tapes, computer tapes, and floppy disks, electric wiring of LSI of electronic devices, electron guns (sources) and electrodes of field emission display, hydrogen storage materials, and display protection plates, face plates, antistatic materials, transparent electrodes, and transparent electrode films at the surfaces of input and display devices of flat panel displays such as transparent touch panels, electroluminescence displays, and liquid crystal displays, and luminescent materials, buffer materials, electron transfer materials, hole transfer materials, fluorescent materials which compose organic electroluminescence devices, heat transfer sheets, transfer sheets, heat transfer image receiving sheets, and image receiving sheets.

What is claimed is:

1. A carbon nanotube-containing composition comprising:
    a carbon nanotube (a); and
    a urethane compound (b) which is a reaction product of a hydroxyl group-containing (meth)acrylate (b-1) and an isocyanate compound (b-2),
    wherein the isocyanate compound (b-2) is represented by at least one of
    the following general formula (4),

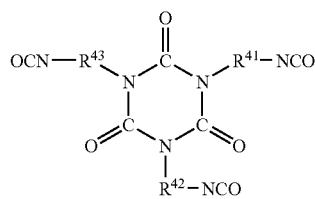

(4)

wherein $R^{41}$ to $R^{43}$ respectively independently represent a divalent group selected from an alkylene group, an arylene group, and an aralkylene group each having 1 to 24 carbon atoms.

2. The carbon nanotube-containing composition according to claim 1, further comprising a polymerizable monomer (c-1).

3. The carbon nanotube-containing composition according to claim 2, further comprising a photopolymerization initiator (d-1) or a thermal polymerization initiator (d-2).

4. The carbon nanotube-containing composition according to claim 1, further comprising a solvent (c-2).

5. The carbon nanotube-containing composition according to claim 1, wherein the hydroxyl group-containing (meth)acrylate (b-1) is represented by at least one of the following general formula (1),

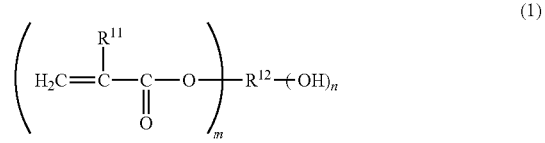

(1)

wherein $R^{11}$ represents hydrogen atom or methyl group, $R^{12}$ represents a hydrocarbon group having 2 to 24 carbon atoms, which may contain an ether bond, and m and n represent an integer, respectively, which is 1 or more while a sum of m and n is the number of the carbon atoms of $R^{12}$ or less; and the following general formula (2),

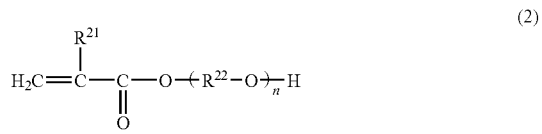

(2)

wherein $R^{21}$ represents hydrogen atom or methyl group, $R^{22}$ represents an alkylene group having 2 to 24 carbon atoms, an arylene group having 1 to 24 carbon atoms, or an aralkylene group having 1 to 24 carbon atoms, and n represents an integer of 1 to 100.

6. A method for producing the carbon nanotube-containing composition according to claim 1, comprising irradiating ultrasonic waves on a mixture obtained by mixing respective raw materials.

7. A method for producing a composite, comprising:
    coating the carbon nanotube-containing composition according to claim 1 on at least one surface of a base material; and
    forming a coating film or cured film by carrying out at least one of leaving the composition to stand at an ordinary temperature, subjecting the composition to heat treatment, and applying photoirradiation to the composition.

8. A method for producing a composite, comprising:
    coating the carbon nanotube-containing composition according to claim 1 on an inside surface of a mold followed by curing the composition to form a cured film;
    pouring one of a polymerizable raw material or a molten resin into the mold followed by solidifying it to make a base material; and
    stripping the base material together with the cured film from the mold.

9. A composite, comprising a coating film or a cured film on at least one surface of a base material, wherein the coating film or the cured film is formed by coating the carbon nanotube-containing composition according to claim 1 on at least one surface of the base material followed by carrying out at least one of leaving the composition to stand at an ordinary temperature, subjecting the composition to heat treatment, and applying photoirradiation to the composition.

10. A composite obtained by coating the carbon nanotube-containing composition according to claim 1 on an inside surface of a mold followed by curing the composition to form a cured film, pouring one of a polymerizable raw material and a molten resin into the mold followed by solidifying it to make a base material, and stripping the base material together with the cured film from the mold.

11. The composite according to claim 9, wherein the total light transmittance of the composite is 50% or more.

12. The composite according to claim 9, wherein the composite is one of a transparent conductive film, a transparent conductive sheet, and a transparent conductive molded article.

13. The composite according to claim 10, wherein the total light transmittance of the composite is 50% or more.

14. The composite according to claim 10, wherein the composite is one of a transparent conductive film, a transparent conductive sheet, and a transparent conductive molded article.

* * * * *